(12) United States Patent
Carhart

(10) Patent No.: US 6,622,304 B1
(45) Date of Patent: Sep. 16, 2003

(54) INTERFACE SYSTEM FOR COMPUTING APPARATUS AND COMMUNICATIONS STATIONS

(76) Inventor: Thomas W. Carhart, 70 S. Longspur Dr., The Woodlands, TX (US) 77380

( * ) Notice: Subject to any disclaimer, the term of this patent is extended or adjusted under 35 U.S.C. 154(b) by 0 days.

(21) Appl. No.: 08/906,853

(22) Filed: Aug. 6, 1997

Related U.S. Application Data

(60) Provisional application No. 60/028,236, filed on Oct. 1, 1996, provisional application No. 60/028,235, filed on Oct. 1, 1996, and provisional application No. 60/025,681, filed on Sep. 9, 1996.

(51) Int. Cl.[7] .................................................. H04N 7/16
(52) U.S. Cl. ............................ 725/74; 725/82; 725/127
(58) Field of Search .............................. 705/78, 74, 75, 705/76, 79, 80, 82, 85, 126, 127, 128, 118, 119, 120, 121; H04N 7/16, 7/173

(56) References Cited

U.S. PATENT DOCUMENTS

| 4,893,326 A | | 1/1990 | Duran et al. ................. 379/53 |
|---|---|---|---|
| 4,935,924 A | | 6/1990 | Baxter ......................... 370/73 |
| RE34,395 E | | 10/1993 | Neumann et al. ............ 29/620 |
| RE34,895 E | | 4/1995 | Morotomi et al. .......... 348/156 |
| 5,408,259 A | * | 4/1995 | Warwick ....................... 348/6 |
| 5,485,630 A | | 1/1996 | Lee et al. ................... 455/4.1 |
| 5,491,508 A | | 2/1996 | Friedell et al. .............. 348/16 |
| 5,534,914 A | | 7/1996 | Flohr et al. .................. 348/15 |
| 5,539,880 A | | 7/1996 | Lakhani ................. 395/200.02 |
| 5,553,064 A | * | 9/1996 | Paff ............................. 370/50 |
| 5,579,308 A | | 11/1996 | Humpleman ............... 370/58.1 |
| 5,642,155 A | * | 6/1997 | Cheng .......................... 348/12 |
| 5,760,822 A | * | 6/1998 | Coutinho ..................... 348/121 |
| 5,787,335 A | * | 7/1998 | Novak ........................ 455/3.2 |
| 5,826,167 A | | 10/1998 | Jelinek et al. ............... 455/5.1 |
| 5,937,330 A | * | 8/1999 | Vince et al. ................. 455/5.1 |
| 5,940,387 A | | 8/1999 | Humpleman ............... 370/352 |
| 6,006,066 A | * | 12/1999 | Krimmel ..................... 455/5.1 |

* cited by examiner

*Primary Examiner*—Chris Grant

(57) ABSTRACT

A system for permitting an interface between a centralized in-home computing apparatus and a plurality of remotely situated in-home communications stations is provided. The system includes a two-way signal path for facilitating communication between the centralized computing apparatus and the communications stations, and a connection to an external signal distribution system such as a cable television (CATV) system. A frequency sensitive splitter/reflector is employed for reflecting input signals generated from the communications stations, and output signals, generated from the computing apparatus, along the signal path. The splitter/reflector blocks signals from the communications stations and the computing apparatus from moving onto the CATV system while allowing signals from the CATV system to move through the splitter/reflector, onto the signal path to the communications stations and computing apparatus. The system may also include means for communication between the computing apparatus and an external data network. Additionally, any application made available to the computing apparatus, whether through the CATV system or the external data network, can be accessed by each of the remote communications stations.

43 Claims, 20 Drawing Sheets

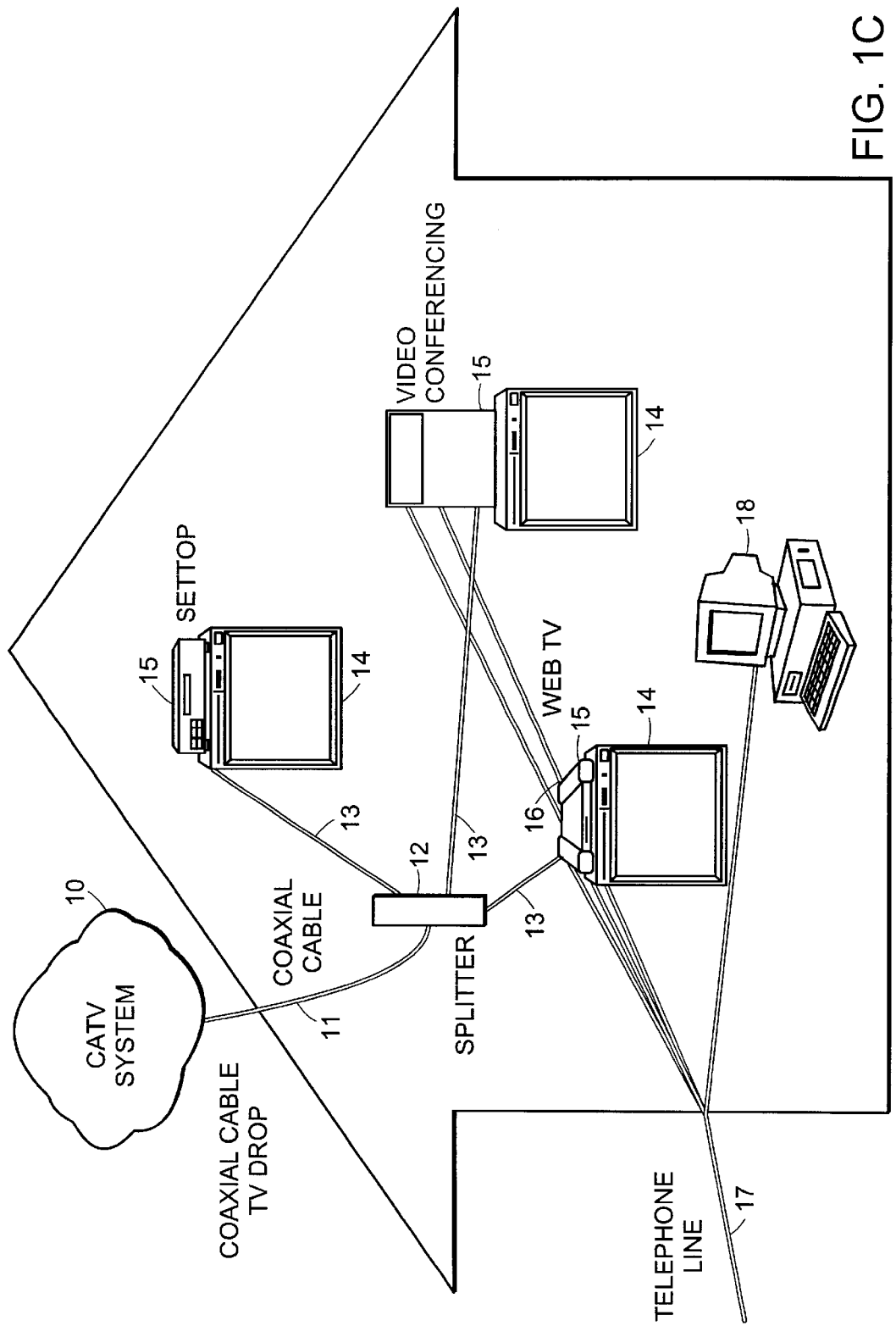

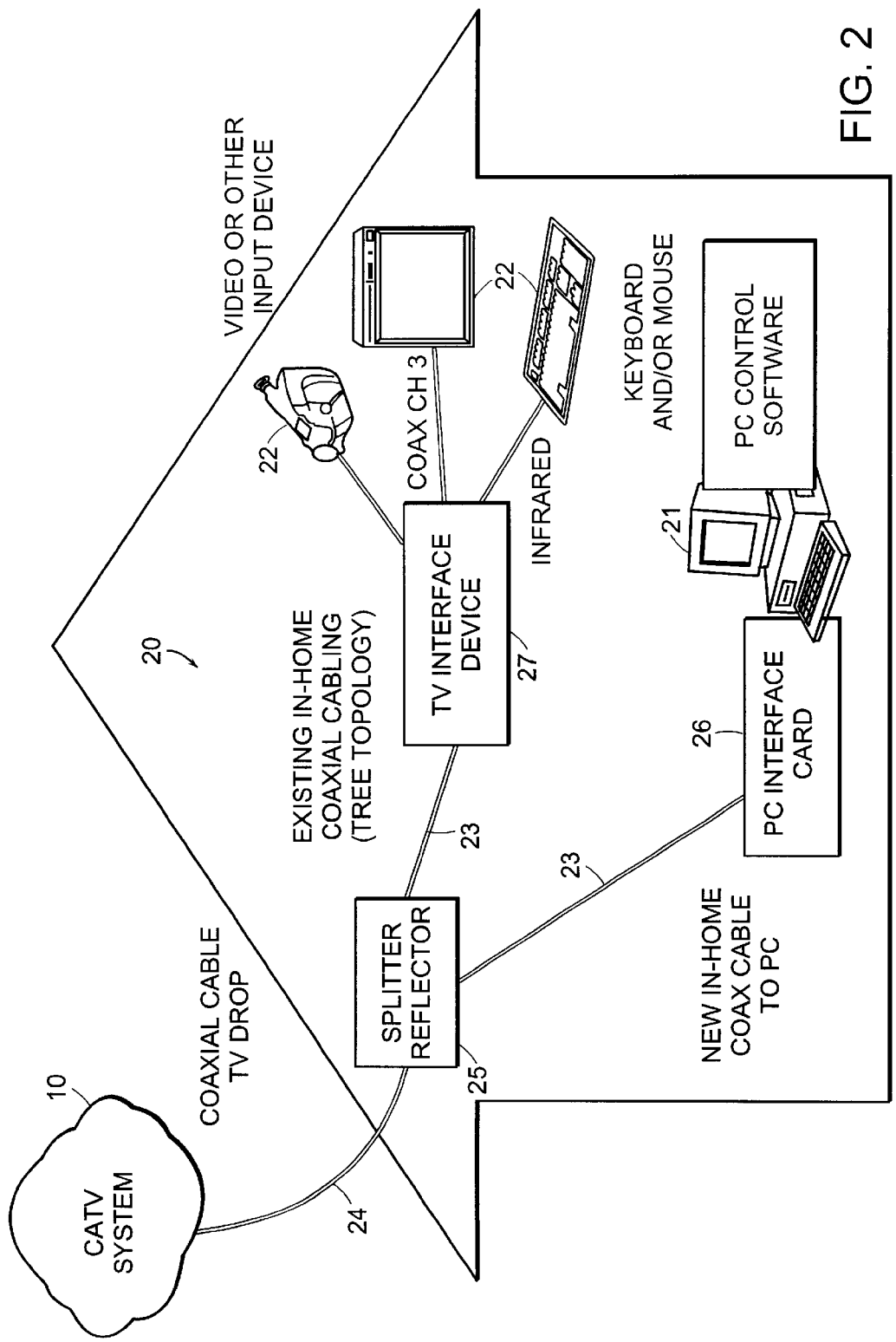

INTERFACE SYSTEM FOR COMPUTING APPARATUS AND COMMUNICATIONS STATIONS

RELATED U.S. APPLICATION

This application claims priority from provisional patent applications serial No. 60/025,681, filed Sep. 9, 1996, serial No. 60/028,235, filed Oct. 1, 1996, and Serial No. 60/028,236, filed Oct. 1, 1996, all of which are hereby incorporated herein by reference.

TECHNICAL FIELD

The present invention relates to a centralized computing architecture using a broadband home signal distribution system for transmitting data and video display signals between a plurality of communications stations, for instance personal computers and video display devices.

BACKGROUND ART

Broadband video distribution systems are widely employed by cable television (hereinafter "CATV") system operators for providing cable television services. These systems distribute cable television signals to residential and commercial subscribers. A broadband television signal is broadcast from a cable system head-end location over a coaxial cable or hybrid fiber coaxial (hereinafter "HFC") cable network to subscriber households or commercial locations. The cable system headend is the local originating point for broadcast signals which are transmitted over the coaxial cable or HFC network. The broadband distribution system is terminated at the subscriber site with a connection to a home coaxial cable signal distribution network.

In general, CATV signals are transmitted in parallel over the coaxial cable or HFC network using frequency division multiplexing, where each of multiple video channels is frequency modulated to a unique non-overlapping frequency and combined onto the shared radio frequency (hereinafter "RF") medium. Each of the video channels remains independent of one another when transmitted (i.e., they do not interfere with each other because of their non-overlapping frequency assignments.) CATV signals typically use a downstream frequency having a range of from about 50 MHz to about 550 MHz for broadcast transmission. Recently, many CATV systems have been upgraded to support a higher frequency transmission, for example, up to 860 MHz or 1 GHz. In some CATV systems, the upgrade results in the replacement of coaxial cables in the system backbone with fiber optic transmission media.

The broadband cable distribution system typically includes a carrier medium, for instance, a coaxial cable or fiber optics cable, to transmit broadband video signals within the downstream frequency range from the cable headend to the subscriber. However, because a broadband signal can become reduced in energy as it travels along the coaxial cable over long distances, or when the broadband signal is split for distribution to remote locations, amplifiers (or fiber optic nodes) may be spaced periodically along the cable distribution system to regenerate the broadband signal. A cable distribution system which supports two-way communication may also include a return band. A return band is usually designed to carry signals, generated at a subscriber location, in a frequency range of from about 5 MHz to about 42 MHz. Such signals may be transmitted in a reverse direction along the return band toward the cable system headend location. These reverse signals are generally diverse and have historically been used to transmit information, such as pay-per-view event purchases, from a subscriber location back to the headend location.

Recent advances have also permitted efficient and cost effective delivery of voice telephony, highspeed data communications, and interactive video services over the broadband cable distribution system, between a subscriber location and the cable headend location. These new services have been made compatible with existing services by using frequency division multiplexing, which allows each new channel or each new cable service to remain independent of the other signals or services present on the coaxial cable network. Moreover, similar to existing video services, these new services focus on the delivery to the home or between the home and the cable system headend location using the existing signal distribution system and methods. Existing signal delivery services, as well as emerging ones, typically employ signal receiving and processing equipment, such as a settop box or a cable modem. A settop or a cable modem is used to first terminate and process communication signals from the cable distribution network and thereafter forward the signals to an appropriate home appliance, such as a TV, personal computer, or telephone.

In addition to a settop box, an existing in-home coaxial cable wiring system may also be used to connect the cable distribution system to devices within the home that receive, use, display, and interact with cable services. This in-home coaxial cable wiring system is often in a star or a tree and branch topology, and includes coaxial cable wiring, passive electrical splitters, and other additional components. Currently, the in-home coaxial cable wiring is only partially utilized as a resource for enabling activities such as an in-home multimedia computing and entertainment. To better utilize the in-home coaxial cable wiring, recently developed methods and systems seek to make use of the in-home coaxial cable wiring or a similar coaxial cable wiring configuration to create, for example, a broadband local area network (hereinafter "LAN"), multimedia network, or home automation system.

U.S. Pat. No. 4,893,326 to Duran discloses a videotelephone communication system in which audio and video signals are transmitted over a coaxial cable network between workstations and audio/video equipment. The Duran system employs a cable distribution unit to perform frequency translation and signal amplification for reduction of video signal ghosting. Duran also discloses using a dual-cable system, instead of a cable distribution unit, to enable this system without frequency translation. The Duran system, however, requires significant circuitry, electronic components, and installation of a cable distribution unit in order to work with existing home coaxial wiring schemes. Alternatively, a second coaxial cable must be installed to each terminating appliance to make this system operational in existing homes.

U.S. Pat. No. 5,534,914 to Flohr discloses a video conferencing system in which data and video signals are transmitted over a coaxial cable network between digital computer workstations and audio/video equipment. The Flohr system employs decentralized computing for the purpose of video conferencing. In other words, each workstation contains a processor and intelligence for selecting the appropriate frequency for signal transmission, reception, and processing. No centralized computing or processing is disclosed, nor are any derivative entertainment applications suggested for the Flohr system. The Flohr system uses an active electronic tuner to select an existing broadband video channel for transmission over the proposed coaxial cable network, where external signals, such as those from a cable television service, are to be transmitted in the video conferencing system. This configuration is not compatible with existing cable television services, which require that a complete broadband signal be present at each terminating home appliance, such as a television monitor, for tuning and possibly descrambling the entire range of cable television channels. Reconfiguration of the Flohr system for compatibility with existing cable television services may not be cost effective.

U.S. Pat. No. 4,935,924 to Baxter discloses a signal distribution network for transmitting video and other signals over a coaxial cable network between a plurality of signal sources and a plurality of signal receivers. A single channel allocation controller is connected on the coaxial cable and is used to transmit channel selection signals on the cable to both the sources and receivers. The employment of active electronics in the controller requires significant component and installation expense. The Baxter system also employs two cable sections, a downstream section and an upstream section, to each terminating appliance. The need for a second coaxial cable section in a home environment where only one coaxial cable currently exists can be costly.

U.S. Pat. No. 5,539,880 to Lakhani discloses a cable-based interactive multimedia workstation network using coaxial cable in a loop topology for connecting multimedia workstations and enabling full motion picture transmission, high fidelity audio communications, and data transmission. The loop topology, however, cannot be used for existing home coaxial cable systems without significant rewiring expense. The current home coaxial cable system uses a star or tree and branch topology.

U.S. Pat. No. 5,485,630 to Lee discloses an audio/video distribution system using coaxial cable for connecting signals between home appliances and workstations. In the Lee system, one element of the Consumer Electronic Bus (hereinafter "CEBus") Standard requires the use of an active electronic device at Node 0 in the home. This active electronic device provides block conversion (frequency shifting) to avoid in-home communications signals from interfering with existing cable television or off-air video services. The Lee system utilizes a dual coaxial cable configuration. The deployment of a second coaxial cable and active electronics at Node 0 into existing home coaxial wiring schemes can be costly.

U.S. Pat. No. 5,491,508 to Friedell discloses a PC video conferencing system, wherein coaxial cables are used to connect a plurality of computer workstations to one another via a communication hub. The Friedell system, which does not employ centralized computing for multimedia and entertainment purposes, utilizes an active electronic hub device for channel selection and modulation. The Friedell system, in addition, employs a dual coaxial cable in a star topology. To adapt the Friedell system to current home coaxial wiring schemes is costly.

U.S. Pat. No. 5,579,308 to Humpleman discloses a home network architecture using a crossbar/hub arrangement for multimedia network to connect a home computer with entertainment devices. While Humpleman establishes an in-home network, the system requires active electronic components in the network interface unit to selectively connect in-home devices to the broadband network. The need for a network interface unit and the cost associated with its installation can increase the expense significantly if the Humpleman system is used for the creation of an in-home network using existing coaxial cable wiring.

There are also systems to provide in-home monitoring using remote cameras that display image information on a television monitor using the home coaxial cable wiring system. One such example is U.S. Pat. RE 34,895 to Morotomi which discloses a home automation system. Morotomi discloses means for using remote cameras and in-home coaxial cable wiring for monitoring. Morotomi also discloses the use of a home bus, but does not provide any specific detail regarding the home bus. In addition, no disclosure is made regarding the potential interference between the remote camera video signals and the broadband video signals during simultaneous use of monitoring and video reception or during simultaneous reception of video signals on multiple television sets within a home. It should be noted that a typical splitter device used in an existing in-home coaxial wiring scheme provides from about 20 dB to about 40 dB of isolation between the output ports to minimize the interference with the broadcast video signal and minimize the ghosting caused by signal reflections. However, the present isolation capability of splitter devices in existing coaxial wiring schemes, which is being used to increase the quality of broadcast video signals, may prevent, in some instances, an adequate signal strength from reaching receiving devices of an RF home broad-band system, unless additional signal strength is provided at a transmitter to overcome the splitter isolation. If additional signal strength is used (usually at additional expenses) to overcome the splitter isolation, increased output filtering is required (also at a significant expense) to prevent interference with existing video services. Furthermore, locally transmitted signals of high strength are more likely to interfere with reception of broadcast video services. Moreover, the use of remote cameras, such as those disclosed in the Morotomi, may cause remote camera signals that are transmitted back onto the cable distribution system to interfere with existing cable television services on the cable operator distribution system. The Morotomi and similar systems also do not utilize a centralized computing design. Rather, dedicated computers are employed, at significant additional expense, at each receiving device (e.g., a television monitor or video monitor) to receive and appropriately process and display remote images.

Accordingly, it is desirable to provide a cost effective system for providing a centralized computing network for transmitting data and video display signals between a plurality of communications stations, such as a television, video monitors or emerging digital TV display devices, over existing home coaxial cable wiring schemes without the employment of costly dedicated and proprietary devices.

SUMMARY OF THE INVENTION

The present invention makes unique use of new and existing in-home coaxial wiring systems to provide centralized computing with remote input of data from a communications station and remote display of the processed results to the appropriate display monitor associated with the communications station within a residential home. In general, current systems utilizing in-home wiring schemes for remote computing and entertainment employ a decentralized set up. These decentralized systems must be set up so that any end-point (i.e., terminating communications station) may communicate with any other end-points by going through a processing unit to which each end-point is connected, or by going through a cable connecting each of the end-points to one another. The system of the present invention, on the other hand, is a centralized system generally having a central processing unit. The system is designed to allow communication between the processing unit and those end-points having a pathway to the processing unit, but not necessarily between end-points directly.

In accordance with one embodiment of the present invention, a system is provided for permitting an interface between a central computing apparatus, for example, a computer, and at least one remotely situated communications station, for instance, a keyboard and associated television monitor and associated keyboard. The interface system, in a preferred embodiment, includes a two-way signal path, such as an in-home coaxial cable, for facilitating communication between the communications station and the central computing apparatus. The signal path is coupled to an external signal distribution system, for example, a subscriber drop circuit to the subscriber home if the external distribution system is CATV. If, on the other hand, the external signal distribution system is for satellite TV, the signal path will be, of course, connected to a satellite signal receiver rather than a CATV drop cable. In general, the CATV cable distribution system is designed to transmit and receive signals below a frequency band $f_1$. Where the external CATV cable system intersects the signal path, a frequency sensitive splitter/reflector device is employed for reflecting input signals, generated above the frequency band $f_1$ from the communications station, and output signals, also generated above the frequency band $f_1$ from the central computing apparatus, along the signal path between the communications station and the central computing apparatus. The splitter/reflector, however, allows signals from the CATV cable system below the frequency band $f_1$ to be freely transmitted onto the in-home signal path, and move along the path to and from a terminating communications station, for instance, a settop box or a computer. In this manner, interference between the signals from the CATV cable system and signals generated from the central computing apparatus and communications station, can be minimized along the signal path. Furthermore, the frequency sensitive nature of the splitter/reflector device protects signals passing between the centralized computing apparatus and communications station from being forwarded, as interference, onto the CATV cable distribution system. The splitter/reflector device also prevents a frequency band below $f_1$ from passing between the centralized computing apparatus and communications station to prevent ghosting and interference caused by reflection of signals having a frequency band below $f_1$.

The present system also includes a first component and a fourth component positioned in the signal path adjacent and the central computing apparatus for providing an interface between the computing apparatus and the communications station. The first component is designed to modulate output signals from the central computing apparatus to a frequency band $f_2$, and to convert the output signals to a format compatible for detection and display by the communications station. The fourth component is designed to demodulate input signals from the communications station to a digital baseband signal recognizable by the central computing apparatus, and for converting the input signals from the communications station to a format compatible for processing by the central computing apparatus.

The system further includes a second component and a third component positioned in the signal path adjacent and each communications station for providing an interface between the computing apparatus and the communications station. The second component is designed to frequency shift or demodulate the output signals from the central computing apparatus to a frequency or baseband signal receivable by the communications station, and to format, if necessary, the converted output signals from the central computing apparatus for detection by the communications station. The third component is designed to modulate the input signals from the communications station to a frequency band $f_3$, and for transmitting the input signals to the central computing apparatus. Input signals may be generated by one or multiple standard computer input devices, including but not limited to a keyboard, mouse device, digital or analog video camera, audio microphone, etc. It should be appreciated that frequency bands $f_2$ and $f_3$ are not similar to frequency band $f_1$, and are generally greater than frequency band $f_1$. Transmission of frequency bands $f_2$ and $f_3$ are limited to transmission along the signal path by the reflector.

The interface system of the present invention may be used to provide a system for enabling multimedia computing and entertainment, including but not limited to reception of digital television or broadband media, audio/video conferencing, accessing the World Wide Web (hereinafter "WWW"), and playing interactive games, over existing home coaxial cable wiring schemes using, for instance, remote input devices and associated television monitors, video display monitors, or emerging digital display apparatuses, in connection with a personal computer. Moreover, the design of the present interface system permits remote use of a personal computer in a centralized manner, thereby enabling multiple shared uses for this computer from remote locations, in addition to dedicated computing. Shared use of a centralized computing apparatus is more cost effective than employment of these apparatuses in a dedicated manner. The present interface system also permits frequency sensitive network partitioning of a coaxial cable wiring system in residential homes, using only passive electronic devices at key coaxial cable intersections in the home to minimize component and installation cost. This may be achieved while providing the present interface system with compatibility to existing and emerging broadcast TV, CATV, telephony, and high-speed data services provided over a cable distribution system. In other words, the present system does not interfere with services external to the residential home, such as those provided over an external coaxial cable or HFC distribution system.

The centralized computing design of the present system further permits an increase in the processing power, memory, and video display capabilities of remotely situated communications stations, for example, television monitors, such that these remotely situated communications stations may be provided with interactive multimedia computing and entertainment. The present interface system may be utilized with minimal installation and operating expenses typically associated with the connection of a computer to each remote television monitor, monitor display, or emerging digital display apparatus and input device.

BRIEF DESCRIPTION OF THE DRAWINGS

FIGS. 1A–1C illustrate existing in-home coaxial cable and telephone wiring topologies;

FIG. 2 illustrates diagrammatically an interface system in accordance with one embodiment of the present invention;

DETAILED DESCRIPTION OF SPECIFIC EMBODIMENTS

Figure 1A:
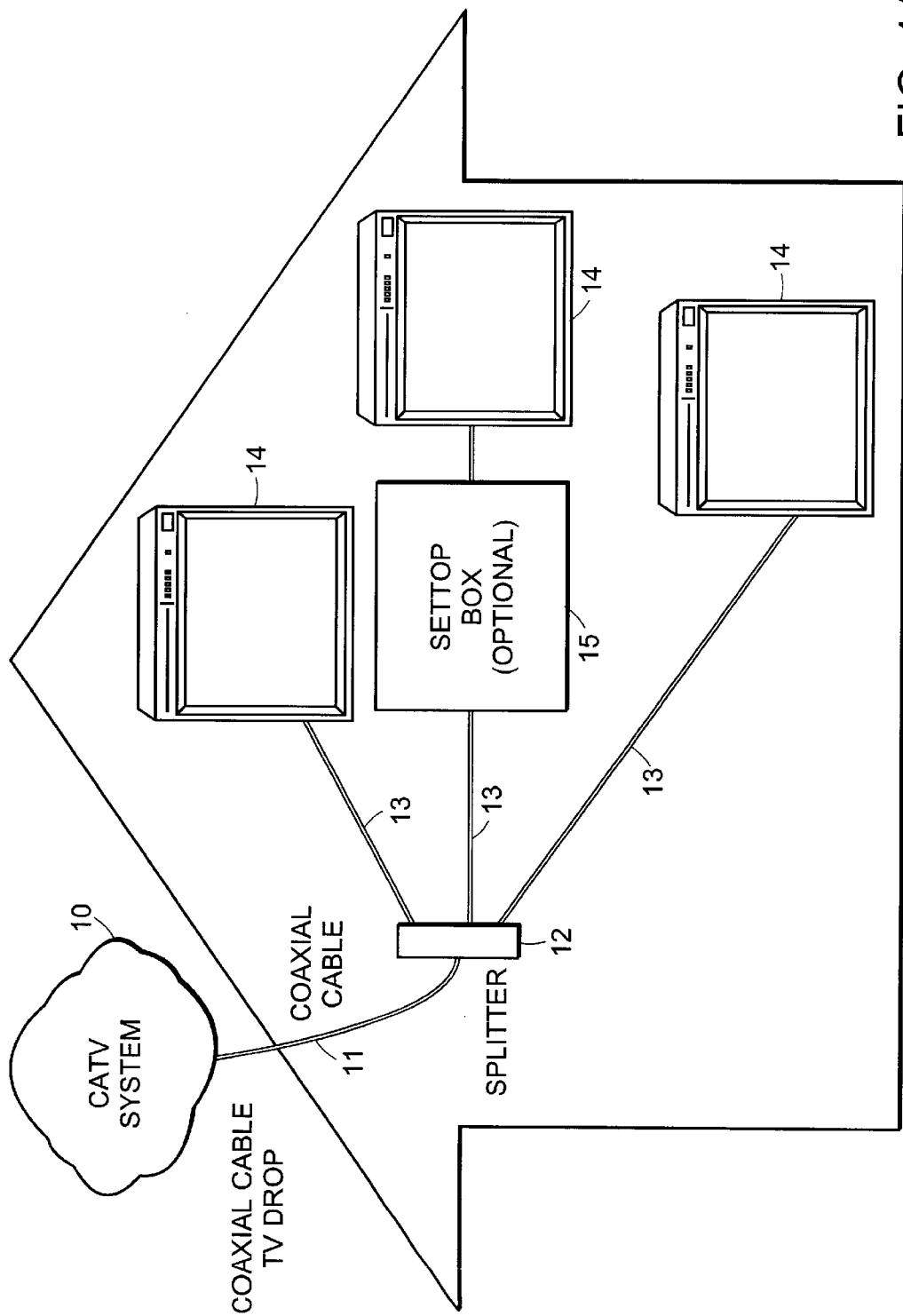

FIG. 1A illustrates an existing in-home coaxial cable wiring scheme in a star topology. This coaxial cable wiring scheme is designed to receive signals, for instance, cable television signals from a CATV cable system 10, and distribute such signals to terminating communications stations, such as cable-ready TV monitors 14 or a settop box 15. A settop box is sometimes employed to enable reception of specially scrambled video channels offered as a premium service with an incremental user fee. Signal from the CATV system 10 is introduced into the subscriber home by means of a coaxial cable subscriber drop circuit 11 (hereinafter "drop cable"). The drop cable 11, as shown in FIG. 1A, is connected to an in-home splitter 12, for the purpose of replicating the input CATV signals on each of the in-home coaxial cable circuits 13. This in-home splitter may be of a 1:N branches design, wherein as N becomes higher, the signal strength on each coaxial cable 13 becomes lower due to a wider distribution of shared energy received at the splitter 12 from the drop cable 11. The splitter 12, as shown in FIG. 1A, has a 1:3 split configuration, and acts to split and distribute CATV signals directly to the TV monitors 14 via the coaxial cable 13, or through a settop box 15, used for tuning CATV signals and/or descrambling signals for premium channels. If necessary, a ground block (not shown) may be employed for the purpose of providing a signal ground at the location of the in-home splitter 12.

Figure 1B:
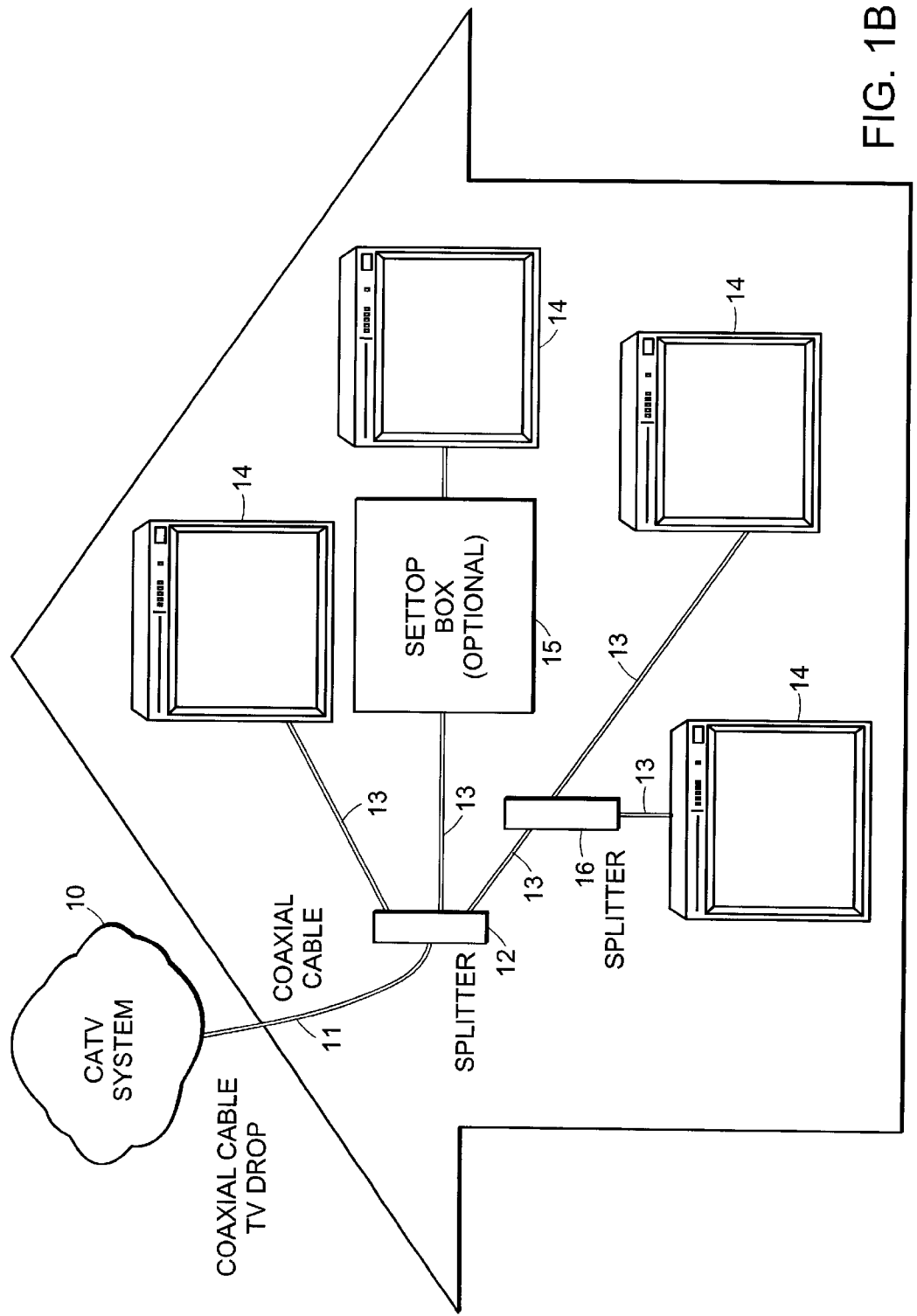

FIG. 1B shows an existing in-home coaxial cable wiring scheme in a tree-and-branch network topology. As illustrated in FIG. 1B, a second additional splitter 16, may be used, if necessary, to further split and distribute signals, such as CATV signals, from the drop cable 11 to terminating communications stations, such as TV monitors 14.

FIG. 1C illustrates another existing tree-and-branch network topology for in-home use. In this embodiment, various in-home computing apparatuses (e.g., computers 18) and communications stations (e.g., TV monitors 14, settop boxes 15, and Internet appliances, such as Web TV devices 16) may be connected to either the in-home coaxial cable 13 or the local telephone line 17. Some in-home electronic appliances, such as WebTV device 16, or other Internet appliances, may be connected to both the coaxial cable 13 and local telephone line 17 to provide user services using both of these communication connections. In turn, the Web TV device 16 or Internet appliance is connected directly to a television monitor or display device, and is dedicated to providing video output using that dedicated monitor connection.

Figure 1D:
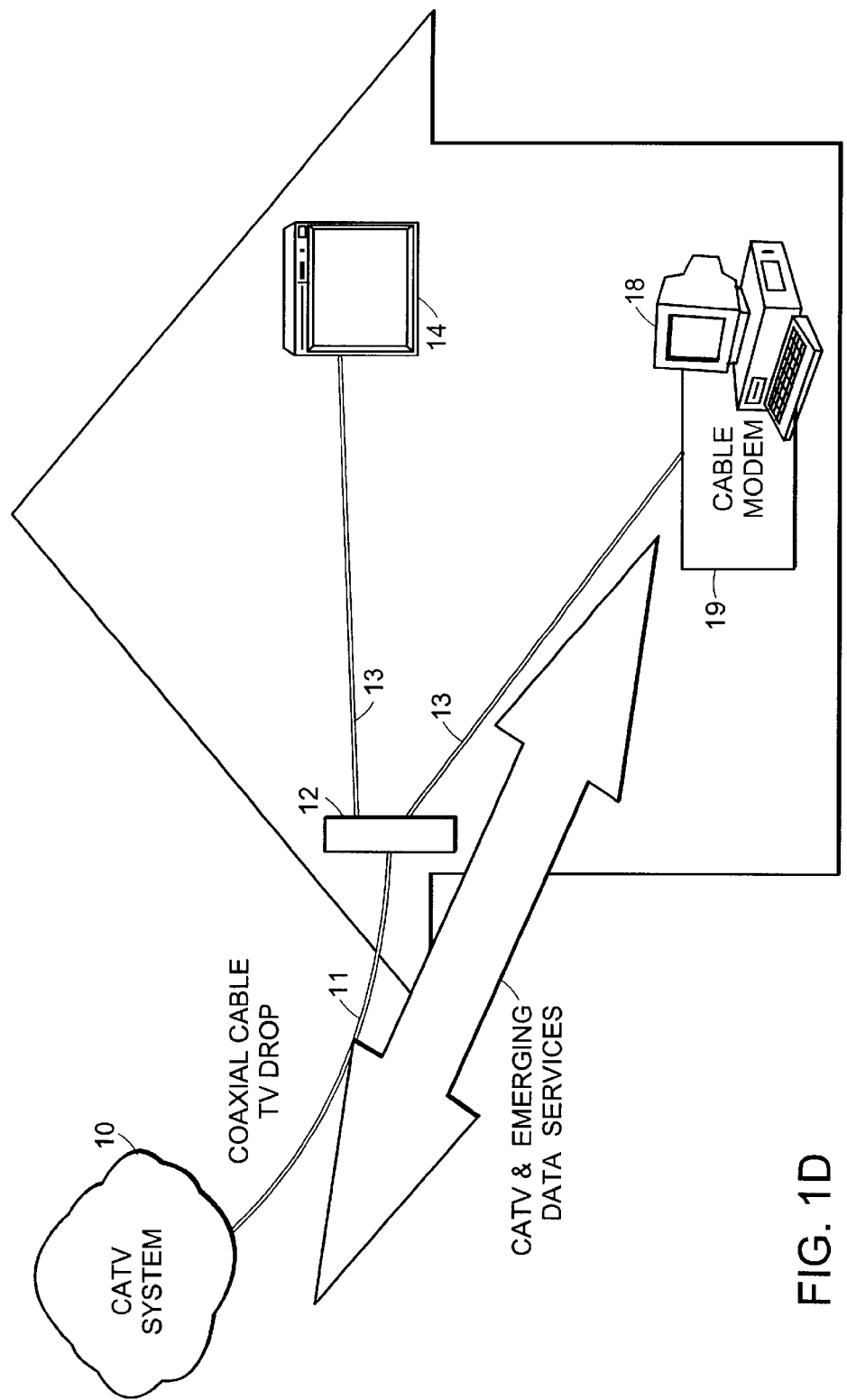
FIG. 1D shows a wiring topology for high-speed data communications service with a cable operator.

FIG. 1D shows a current wiring topology for an emerging class of new cable TV services, in particular, high-speed cable data communications. This service connects a high speed data network to the personal computer 18 via the in-home coaxial cable 13 using a cable modem device 19, or other existing and emerging data communications network connections, such as a modem, an ISDN terminal adaptor, a router, a switch, a mux, etc. This and other emerging services provided by the CATV cable system 10 are similar in that they provide one-way and two-way communications between an in-home communications station and the cable distribution system.

FIG. 2 illustrates, in accordance with one embodiment of the present invention, a system 20 for providing an interface between a central computing apparatus 21 (e.g., a computer) and at least one communications station 22 (e.g., video display device, keyboard, mouse, video camera, or audio microphone). As illustrated in FIG. 2, an existing in-home coaxial cable 23 system is used to provide centralized computing and processing with the computing apparatus 21, such as a computer, by way of remote user input, such as that from a remotely situated communications station 22. The input signals are processed by the computing apparatus 21, then the resulting video output is transmitted to the appropriate remote communications station 22 and displayed on the associated monitor. By providing such an interface system between a central computing apparatus and a communications station, the processing capability of the central computing apparatus 21 may be fully utilized from any remotely situated communications station 22. It should be appreciated that the remotely situated communications station 22 does not perform any processing of data. Rather the remotely situated communications station 22 only acts to transmit input data from the communications station 22 to the central computing apparatus 21, where the data is ultimately processed. The interface system 20 is further designed to utilize the excess unused bandwidth on the in-home coaxial cables. Currently, an in-home coaxial cable 23 system is used to provide CATV services in the frequency spectrum below approximately 750 MHz, even though the coaxial cable is inherently capable of carrying much higher frequencies. The limited use of the frequency spectrum is imposed by the cable distribution system and the physical properties of a coaxial cable. In particular, as a coaxial cable increases in length, any increase in the signal frequency, in light of the inherent energy dissipation along the cable, can magnify the signal attenuation. In a cable distribution system with many miles of cable, this signal attenuation becomes significant, limiting the frequencies at which cable signals may be provided. However, within the confines of a subscriber home where each coaxial cable is less than several hundred feet in length, this signal attenuation is less significant, allowing the employment of high frequencies and wider bandwidth signals to be used for signal transmission between locally connected stations.

To provide the necessary interface for communication between a central computing apparatus 21 and at least one remotely situated communications station 22, the system 20, as shown in FIG. 2, includes a two-way signal path, such as coaxial cable 23, connecting the computing apparatus 21 to the communications station 22. Although the present invention preferably uses coaxial cables, it should be appreciated that other means for allowing transmission of signals along a path are contemplated, for example, a wireless medium using RF or infrared signals. The signal path 23, capable of supporting frequency division multiplexing of signals not traditionally used by CATV coaxial cables, may be coupled to an external coaxial cable drop 24, which is designed to transmit signals at a frequency band $f_1$ from a nearby CATV system into a home. This frequency band $f_1$ generally falls within a range of from about 50 MHz to about 550 MHz. Where the coaxial cable drop 24 connects to the signal path 23, a splitter/reflector 25 is provided for maintaining input signals from the communications station 22, and output signals from the central computing apparatus 21 along the signal path 23. In a preferred embodiment, the splitter/reflector 25 is a passive device, using frequency sensitive reflection to reflect the locally (i.e., in-home) generated input signals from the communications station 22 to the computing apparatus 21, and output signals from the central computing apparatus 21 to the communications station 22. Each of the input and output signals is formatted so that its specific frequency band is different from the frequency bands of the other signals transmitted along the external coaxial cable drop 24. The splitter/reflector 25 also acts to prevent transmission of the locally generated input signals from the communications station 22, and output signals, from the central computing apparatus 21, onto the external coaxial cable drop 24. The splitter/reflector 25, however, is designed not to interfere with signals transmitted from the external coaxial cable drop 24, and to allow such signals to freely move across the splitter/reflector onto and off of the signal path 23. To this end, the signals transmitted along the coaxial cable drop 24 may still be received downstream by the communications station 22 or computing apparatus 21.

Figure 3:
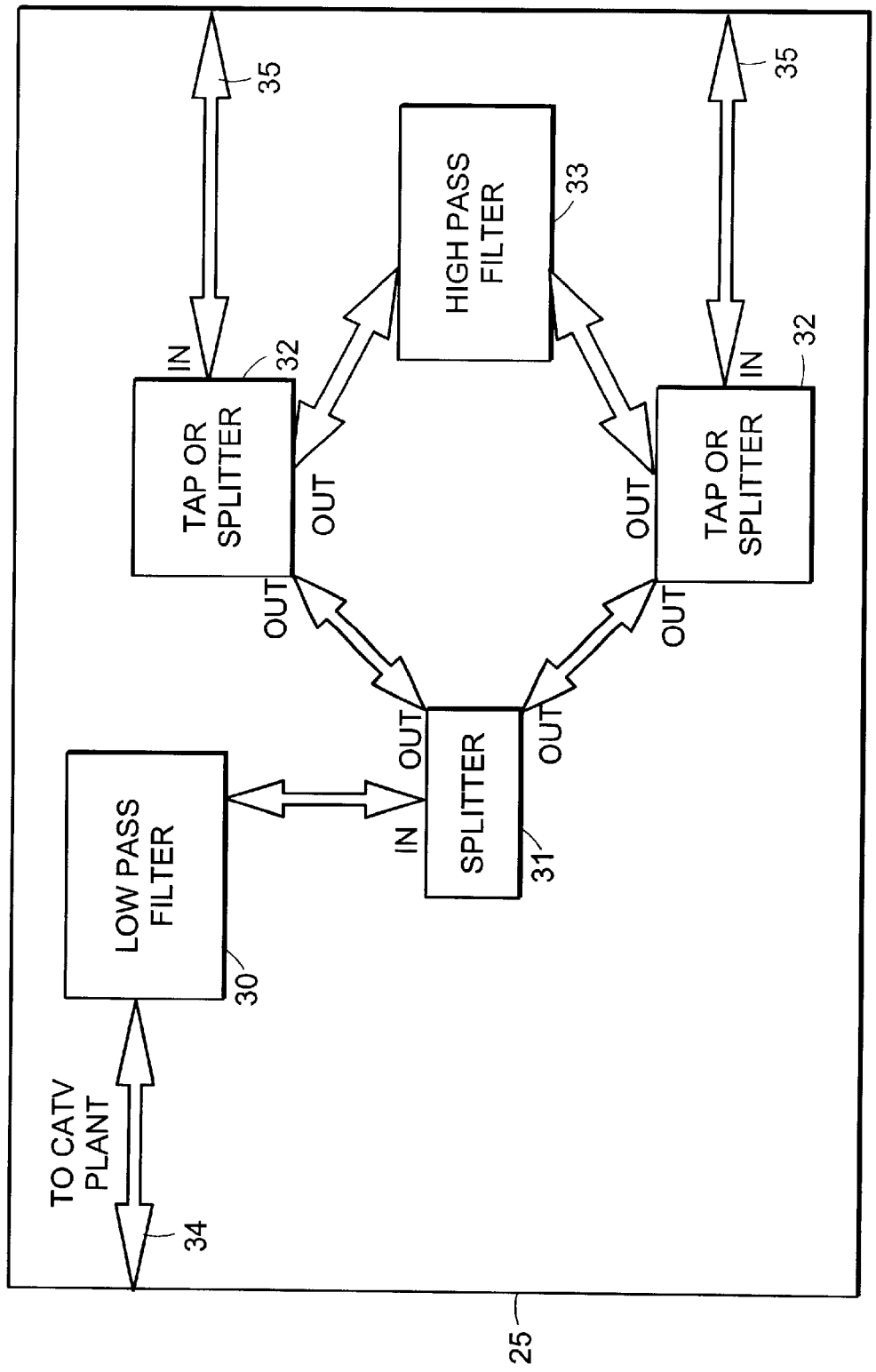
FIG. 3 shows a functional block diagram for a splitter/reflector device employed in the system of FIG. 2.

FIG. 3 illustrates one embodiment of the splitter/reflector 25 employed in the present invention. As indicated, the splitter/reflector 25 is a passive frequency sensitive splitter, which allows the partitioning of signals from a CATV cable network, such that only select frequency bands are transmitted between ports 34 and 35. The splitter/reflector 25 includes a bidirectional passive broadband low-pass filter 30 connected to port 34. The filter 30 preferably has a cutoff frequency band of $f_1$ to allow CATV signals below the cutoff frequency band to pass clearly through the low-pass filter 30. CATV signals above 750 MHz, on the other hand, cannot pass through the filter 30. In a preferred embodiment, the cutoff frequency is about 750 MHz. However, this frequency may be easily modified depending on the bandwidth of the attached cable distribution system. The splitter/reflector 25 also includes a first broadband splitter 31, connected to the filter 30, and at least one second broadband splitter 32, connecting the first broadband splitter 31 to an output port 35. The output port 35, in turn, is connected to the in-home coaxial cable 23. In the embodiment of FIG. 3, the first broadband splitter 31 preferably has a 1:2 splitting configuration, wherein one end of the splitter 31 is connected to filter 30, and the other end of splitter 31 is connected to two second broadband splitters 32. Similarly, each second broadband splitter 32 is preferably of a 1:2 splitting configuration, wherein one end of the second splitter 32 connects to the first splitter 31, and the other end of the second splitter 32 connects to a high pass filter 33 and an output port 35. The second broadband splitter 32, in a preferred embodiment, is designed with an inverse signal flow path relative to the first broadband filter 30. In this manner, broadband signals using a frequency band below $f_1$, such as those signals from a nearby CATV system, are allowed to pass bidirectionally through this splitter/reflector 25 to and from input port 34 to output port 35. Signals above frequency band $f_1$, such as those from the computing apparatus and communications station, are blocked from transmission onto the cable distribution system through port 34 by the low-pass filter 30, thereby preventing undesired locally induced frequency interference with the signals from the nearby cable distribution system.

The splitter/reflector 25 is also designed with signal isolation capability to maintain signal quality for existing broadband video services. Such a signal isolation capability may be achieved using the high-pass filter 33 connected to each of the second broadband splitters 32. In a preferred embodiment, the high-pass filter 33 is provided with a cutoff frequency band $f_1$, similar to that in filter 30, so that signals having a frequency band below $f_1$ may be effectively blocked from transmission along the signal pathway 23 between output ports 35. However, signals using a frequency band greater than $f_1$, for the purpose of communication between in-home devices, are allowed to pass freely through the second broadband splitter 32 and high-pass filter 33, and are partitioned and reflected along the in-home coaxial cable wiring system without interfering with existing CATV services. It should be appreciated that the embodiment shown in FIG. 3 only illustrates functional equivalent components, of which there are other means for implementation.

Figure 4:
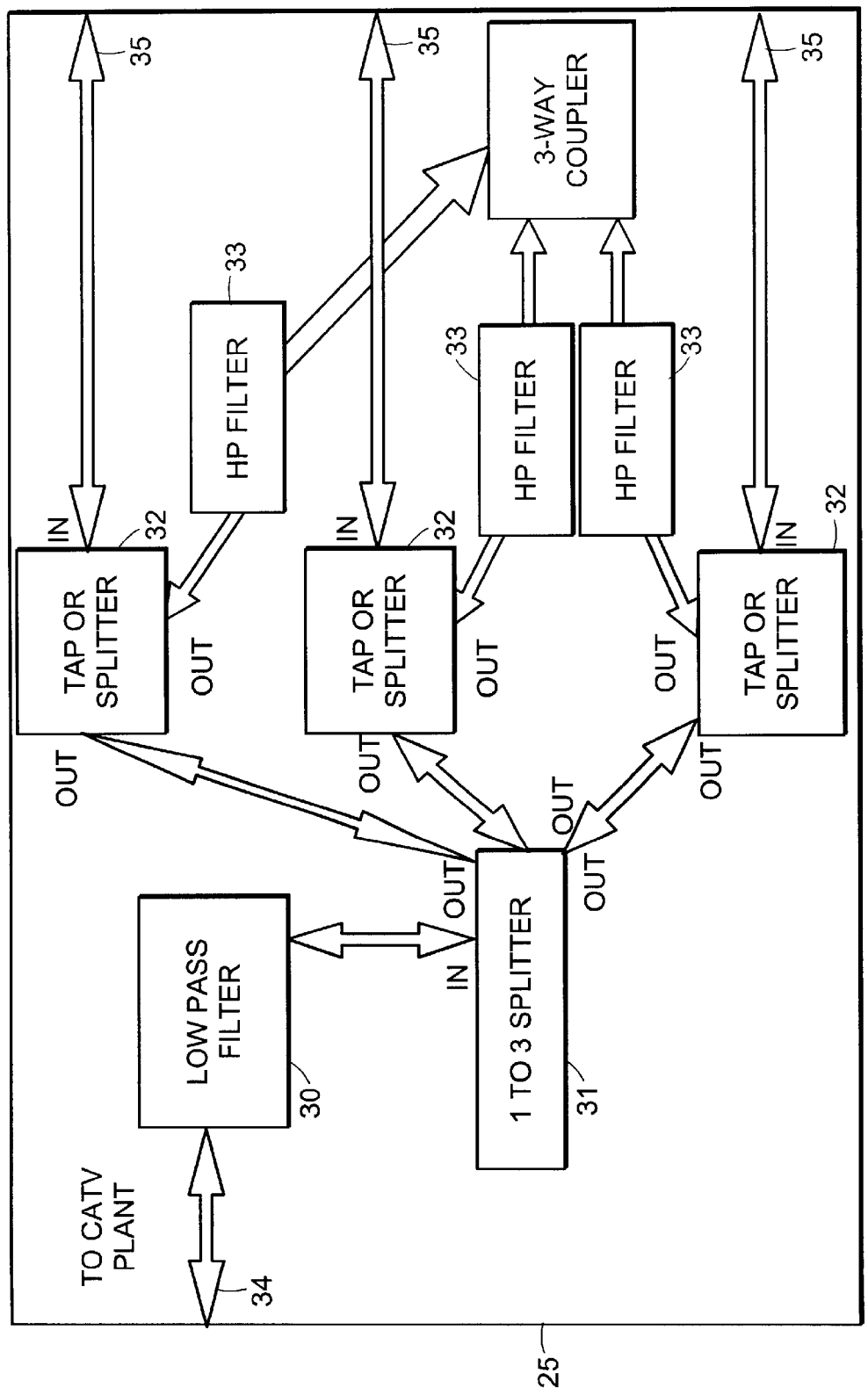
FIG. 4 is a functional block diagram of the splitter/reflector in FIG. 3 having a multiple branch topology.

In an alternative embodiment, the splitter/reflector 25 is designed to allow frequency sensitive partitioning of a select frequency band in a portion of the composite broadband spectrum used for delivery of CATV services. To accomplish this, a band-notch filter (not shown) in place of the low-pass filter 30, and a band-pass filter (not shown) in place of the high-pass filter 33 may be used. In addition, as shown in FIG. 3, a tap device may be used in place of the splitter 32, depending on the optimization of the splitter/reflector 25 for local isolation and signal amplitude requirements. A tap device is similar to a splitter in that it allows a signal, for instance, an RF signal, to pass from an input port to two or more output ports. Generally, a splitter divides the output signal strength equally among all output ports. For example, a 1:2 splitter allows a signal to pass through each of the two output ports at half its original signal strength. A tap device, on the other hand, provides configurable allocation of signal strength between output ports, such that most of the signal energy may pass through one output port, and a lesser secondary signal energy may pass through a second or another output port. The use of a tap device enables optimization of the splitter/reflector 25 by either minimizing signal strength loss from input port 34 to output port 35, or minimizing signal strength loss between output ports 35, depending on the nominal signal strength provided for CATV services. Thus, if the nominal signal strength for video services at input port 34 is the minimum required for reception at a terminating communication station, minimizing a loss between input port 34 and output port 35 would be critical. The use of a tap device would then minimize incremental signal strength loss between input port 34 and output port 35, at the expense of providing increased signal loss between output ports 35. The splitter/reflector 25 may also be designed to support more than just a 1:2 splitting configuration. An example of a 1:3 splitting configuration is shown in FIG. 4. It should be appreciated that the splitter/reflector 25 is used to enhance performance of the interface system of the present invention. It should also be appreciated that in an embodiment wherein a wireless signal path is used, since there is no need for reflection of signals between the communications station and the computing apparatus, a splitter/reflector 25 may not be necessary.

Figure 5:
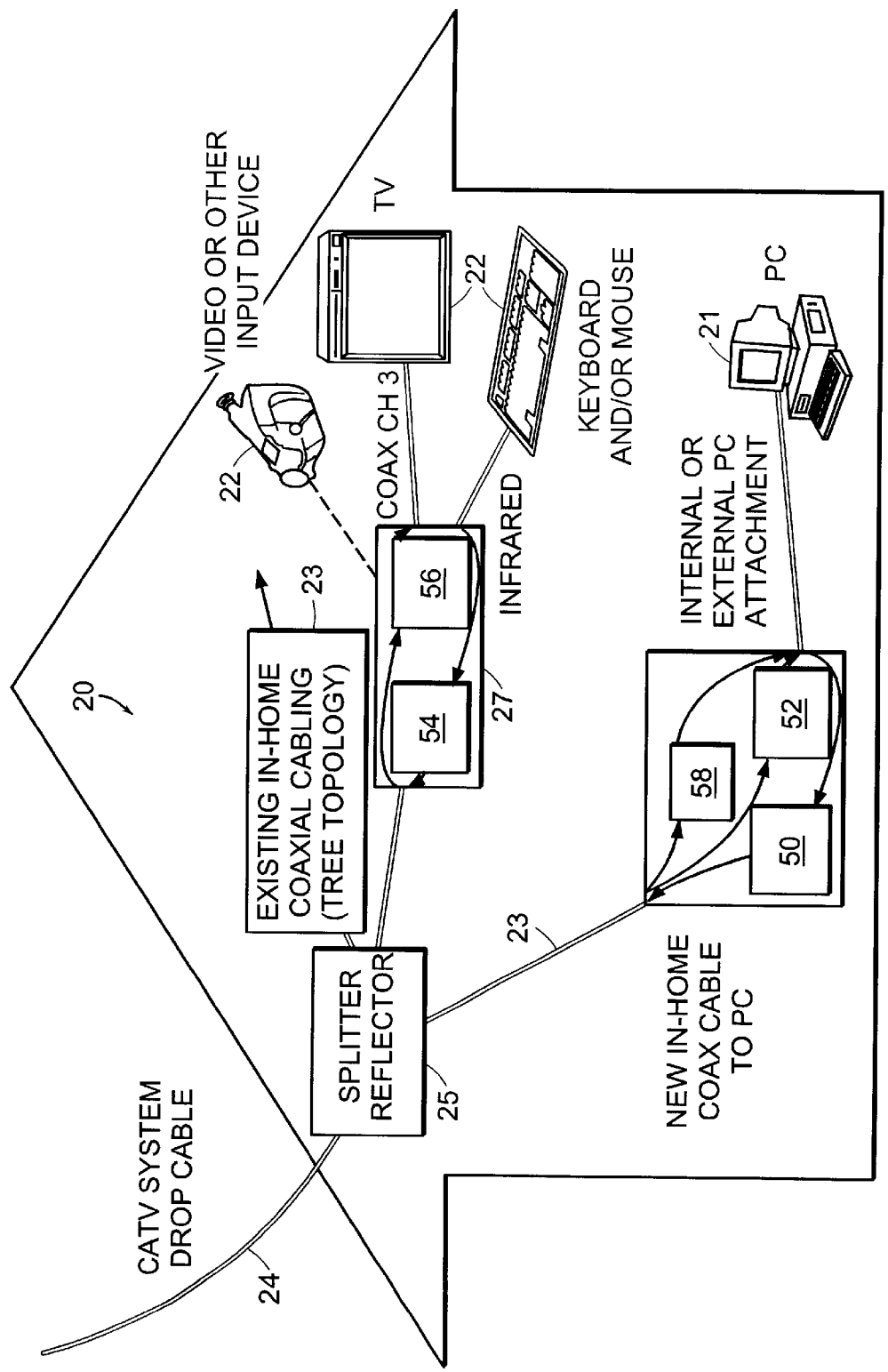
FIG. 5 illustrates a preferred embodiment for connecting the various components of the system shown in FIG. 2.
Figure 6:
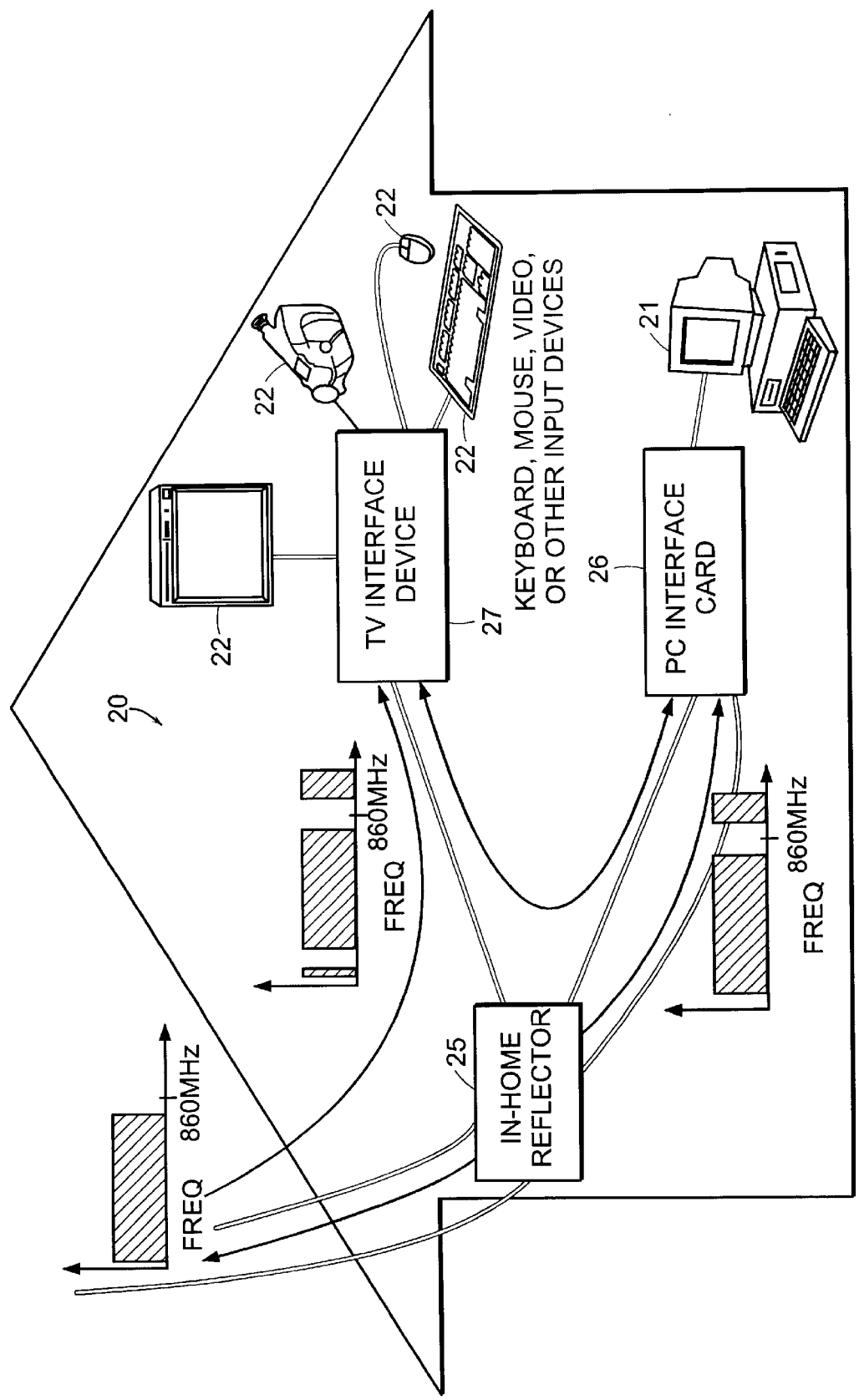
FIG. 6 illustrates an RF spectrum utilization at different points along the in-home coaxial cable wiring for the current invention.

Referring again to FIG. 2, the interface system 20 also includes a computing apparatus interface device 26 positioned in the signal path 23 between the splitter/reflector 25 and the central computing apparatus 21. The interface device 26 may be associated with the computing apparatus 21 internally, such as a peripheral card, or externally. If the interface device 26 is externally associated, a communication path between the interface device 26 and the computing apparatus 21 is preferably provided. Such communication path may be, but is not limited to, an infrared signal, a coaxial cable, a multi-pin cable, or other conventional or emerging data cables, for instance, a Universal Serial Bus extension. In a preferred embodiment, the interface device 26, as shown in FIG. 5, includes a first component 50 designed to modulate output signals (e.g., video display signals), from the computing apparatus 21, to a frequency band $f_2$ that is, for example, greater than about 860 MHz. A signal frequency of greater than 860 MHz may be used with the interface system of the present invention (see FIG. 6) with essentially no spurious emission, and may avoid interference with CATV system signals transmitted along the signal path 23 from the coaxial cable drop 24. The first component 50 may also be designed to convert the output signals to a format compatible for detection by the communications station. If the output signals are to be displayed on, for example, a television monitor, the output signals may be converted to a National Television Standard Committee (NTSC) format, and the resolution enhanced, by means of a digital signal processor (DSP). If the output signals are to be displayed on a computer monitor, the existing VGA, SVGA, or standard computer signal may be modulated in a manner defined by U.S. Pat. No. 5,469,219 (incorporated herein by reference). Alternatively, if the output signals are of a digital format for the reception on a digital monitor or display device, for example, advanced TV (ATV) or high definition TV (HDTV), the output signals may be transmitted using the appropriate digital transmission standard.

The interface device 26 further includes a second component 52 designed to demodulate input signals from the communications station 22, which have previously been modulated to a frequency band $f_3$ that is greater than about 860 MHz, to a baseband signal format recognizable by the central computing apparatus 21. The second component 52, in addition, is capable of converting the input signals from the communications station 22 to a format compatible for processing by the central computing apparatus 21. It should be appreciated that the interface device 26 is independent of the external network connection devices, such as modem, ISDN terminal adaptor, ADSL equipment, etc., which may be used to allow the computing apparatus 21 to access a network, for instance, the Internet. The interface device 26, however, allows signals transmitted through these external network connection devices to the computing apparatus 21 to be subsequently displayed on the remote communications station 22. The device 26, in one embodiment, may include a third component 58 for tuning and receiving broadcast video signals, such as that from a CATV system. Component 58 is a standard TV tuner designed to receive analog or digital broadcast video signals. If the video signals received are analog, component 58 converts the analog signals to a digital format. The video signals from component 58 are then displayed on the local or remote display devices attached to attached to computing apparatus 21.

Figure 7:
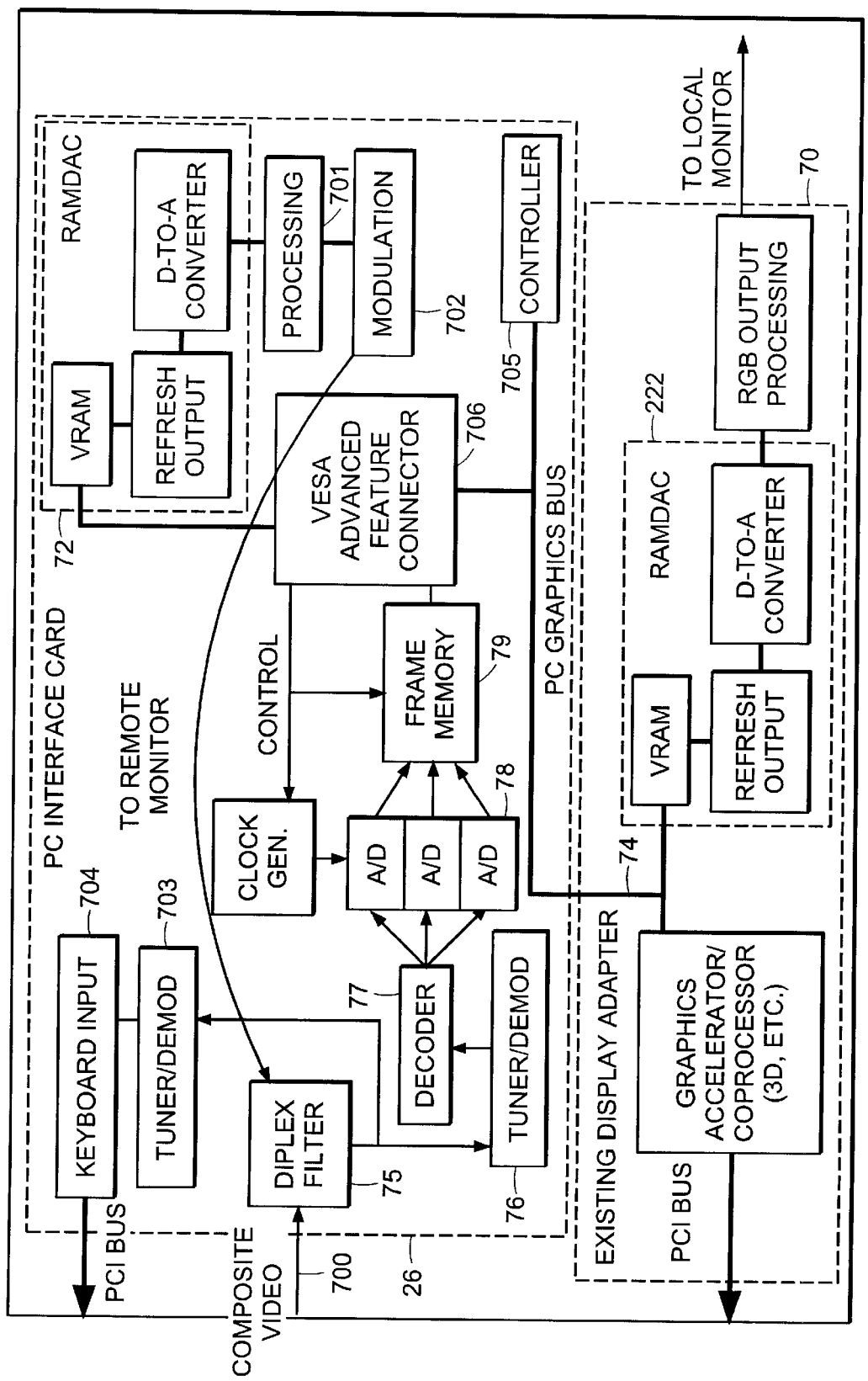
FIG. 7 shows a functional block diagram for a PC interface card employed in the system of FIG. 2.
Figure 8:
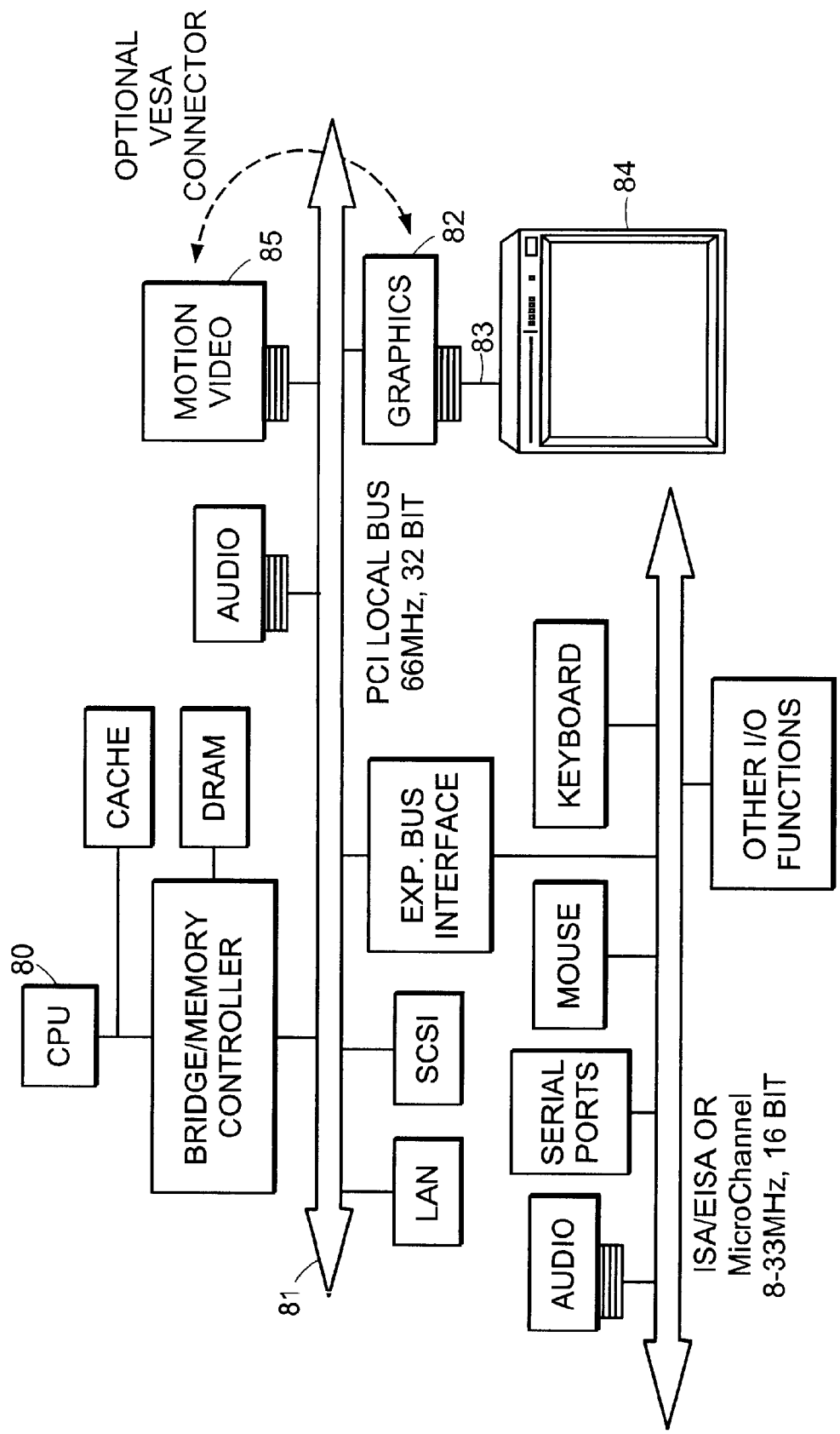
FIG. 8 shows a standard personal computer hardware bus architecture.

FIG. 7 illustrates a functional block diagram for the computing apparatus interface device 26 shown in FIG. 2. However, the context of this component is best understood by first considering the basic architecture of a personal computer system. In FIG. 8, a central processing unit 80 (hereinafter "CPU") of a personal computer is shown connected via a high-speed bus 81 to memory, storage, and input/output functions within a computer system. The CPU 80 is used to drive a graphics display adapter card 82, which generates video signals and connects these signals, using a dedicated cable 83 to a dedicated display monitor 84, for instance, a VGA monitor. When data, video, or other communications input devices are attached to the computer for the purpose of communicating with remote stations, information from these input devices passes over the high-speed bus 81, to the CPU 80, or directly to the graphics display device 84. As illustrated in FIG. 8, it is common for high-speed digital video signals to flow directly from a reception point 85 to the graphics display adapter 82 for display on the attached display system without being transferred through the CPU 80.

Looking again at FIG. 7, there is illustrated one embodiment of a computing apparatus interface device 26, in particular, a peripheral circuit card for a personal computer. The circuit card is shown connected to an existing PC graphics display adapter card 70 in a personal computer system. In the embodiment of FIG. 7, the computing interface device 26 is designed to: 1) generate a video output signal for a remotely attached communications station, 2) receive keyboard or other input device signals from a remote communications station, and 3) receive broadband video signals from a CATV system.

To generate video output signals for remotely attached communications stations, the computing apparatus interface device 26 first reads the computer's video output signal from the existing graphics adapter 70, then transmits the signal over a high speed graphics bus 74 or other standard computer bus into a local video RAMDAC 72 for storage and conversion of the video display signal to the appropriate format for a remotely attached monitor. The video signal format used on the graphics bus 74 typically depends on the type of bus selected, for example, VESA, PCI. The video signal format is preferably in a digital format, such that it may be directly copied from the memory of the RAMDAC 222 on the existing graphics adapter 70 into the memory of the RAMDAC 72 on the computing apparatus interface device 26. The video signal format for the remote display device may include, but are not limited to, NTSC video format for current U.S. television, PAL format for international television, computer VGA, SVGA, etc. formats for remote video monitors, or ATV or HDTV formats for emerging digital video standard monitors and display systems. A processor 701 then processes the video signal, which subsequently gets modulated to a frequency band $f_2$, which can be greater than frequency band $f_1$, by a modulator 702. The processor 701 may include precompensation of the video signal to account for an uneven passband over the in-home coaxial cable wiring scheme. Often, an uneven passband may be caused by the wide bandwidth video signals and variable attenuation at high frequency. The video signal is next transmitted via a diplex filter 75 out of the port 700 onto the attached coaxial cable 23. This process for generating video output signals to remote communications stations corresponds to the functions performed by the first component 50 of the interface device 26.

The computing apparatus interface device 26 may also contain circuitry for receiving remote input signals, such as that from a keyboard, and for converting the signals to input for the computing apparatus. The signals received through port 700 are connected via a diplex filter 75 to a tuner/demodulator device 703. The diplex filter 75 is a frequency sensitive device that allows one-way transmission of signals depending on the frequency. Therefore, input signals are allowed to pass from port 700 to internal modules, and output video signals are allowed to pass from the computing apparatus interface circuitry to the coaxial cable via port

700. The tuner/demodulator 703, on the other hand, tunes, demodulates, and decodes or demultiplexes remote user inputs. The remote input signals from the tuner/demodulator 703 are then transferred to the computing apparatus CPU 80 (FIG. 8) by a keyboard input module 704 under the control of an onboard controller 705. Other input device modules, such as that for a digital camera, may also be included in the interface device 26. This process for receiving and converting input signals from remote communications corresponds to the functions performed by the second component 52 of the interface device 26.

In addition, the computing apparatus interface device 26 may receive composite video signals at port 700 from the CATV system. Once received, the video signals from the CATV system is forwarded through a diplex filter 75, to a tuner and demodulator 76, where any single broadband video channel may be tuned and converted by decoder 77 to a baseband or intermediate frequency video signal. The signal is then digitized by an analog-to-digital (A/D) converter 78, and stored in video memory 79. This digitized video signal is then sent to the existing graphics display adapter 70 using conventional means, either a PCI bus or VESA bus 74, or other standard high speed bus for display on a locally attached monitor. It should be noted that the video memory 79 may not be necessary depending on the type of high-speed bus used to connect to the graphics display adapter. The video signals may then be transmitted to the appropriate local or remote monitor for display. This process for receiving composite video signals corresponds to the function performed by the third component 58 of the interface device 26.

Figure 9:
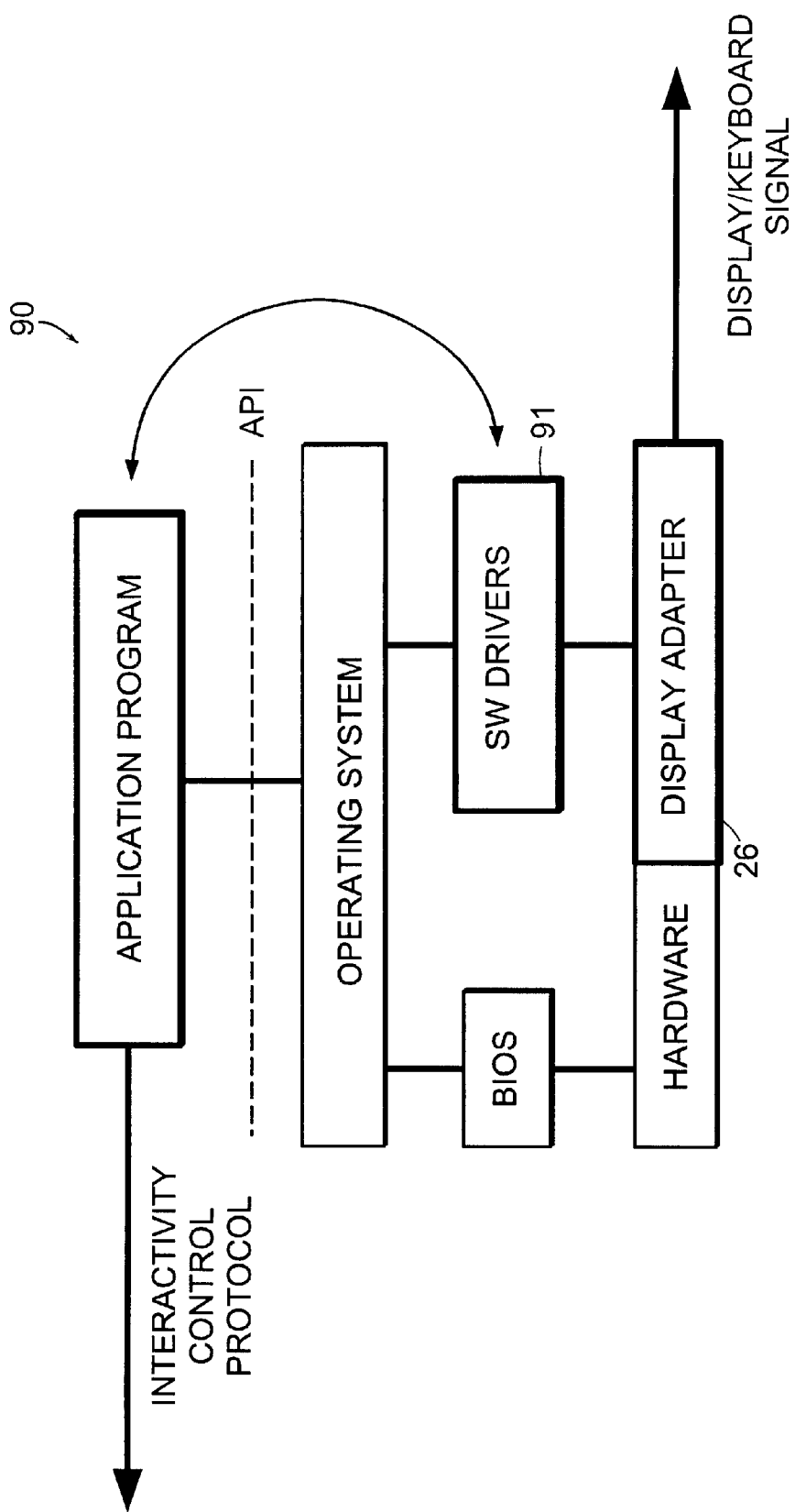
FIG. 9 shows a software hierarchy for controlling the PC interface card in FIG. 7.

In FIG. 9, there is shown a software control hierarchy system 90 commonly used for control of computer peripheral cards in personal computers. The hierarchy system 90 includes software drivers 91 for interfacing operating system commands to the actual computer hardware instructions. Software drivers 91 are generally necessary in order to control the operation of the interface device 26, which operation is based on the operating system and the application software program commands. By interfacing the operating system commands to the computer hardware instructions, higher level software applications may also be run independent of underlying hardware operations.

Referring again to FIG. 2, the interface system 20 may further include an interface device 27 associated with the communications station 22. In accordance with one embodiment of the invention, communications station interface device 27 is positioned in the signal path 23, between each communications station 22 and the splitter/reflector 25. As shown in FIG. 2, the interface device 27 may be associated with each element of communications station 22. For example, if the communications station includes a television monitor and a keyboard, each of the keyboard and television monitor is provided with a separate communication path to the interface device 27. Such communication path, as previously discussed, may be, but is not limited to, an RF or infrared signal, a coaxial cable, a multi-pin cable, or other conventional data cables. In one embodiment, the interface device 27, as shown in FIG. 5, does not require a CPU, and includes a first component 54 for combining and modulating the input signals from the communications station 22 (e.g., keyboard, video camera, or other input devices) to a frequency band $f_3$ greater than about 860 MHz. Such signals, once modulated, are transmitted, with essentially no spurious emission, to the central computing apparatus 21 along the signal path 23. The interface device 27 also includes a second component 56 designed to frequency shift or demodulate the output signals from the central computing apparatus 21 to a frequency or baseband signal detectable by the communications station. The second component 56 further formats the output signals from the central computing apparatus 21 for detection and/or display by the communications station 22. In particular, if the output signals are to be received and displayed on a television monitor, the output signals which are in NTSC format and which are modulated to frequency band $f_2$, are preferably first frequency shifted to a frequency detectable by the television monitor, for example, channel 3 for display on the television monitor. If the output signals are to be received and displayed on a computer monitor, the output signals, which may be in VGA, EGA or other similar video format, are preferably demodulated to a baseband format before being displayed on the computer monitor. Finally, if the signals are of a digital format, such as ATV or HDTV, they may simply be frequency shifted into the appropriate frequency range tunable and detectable by the video display system.

Figure 10:
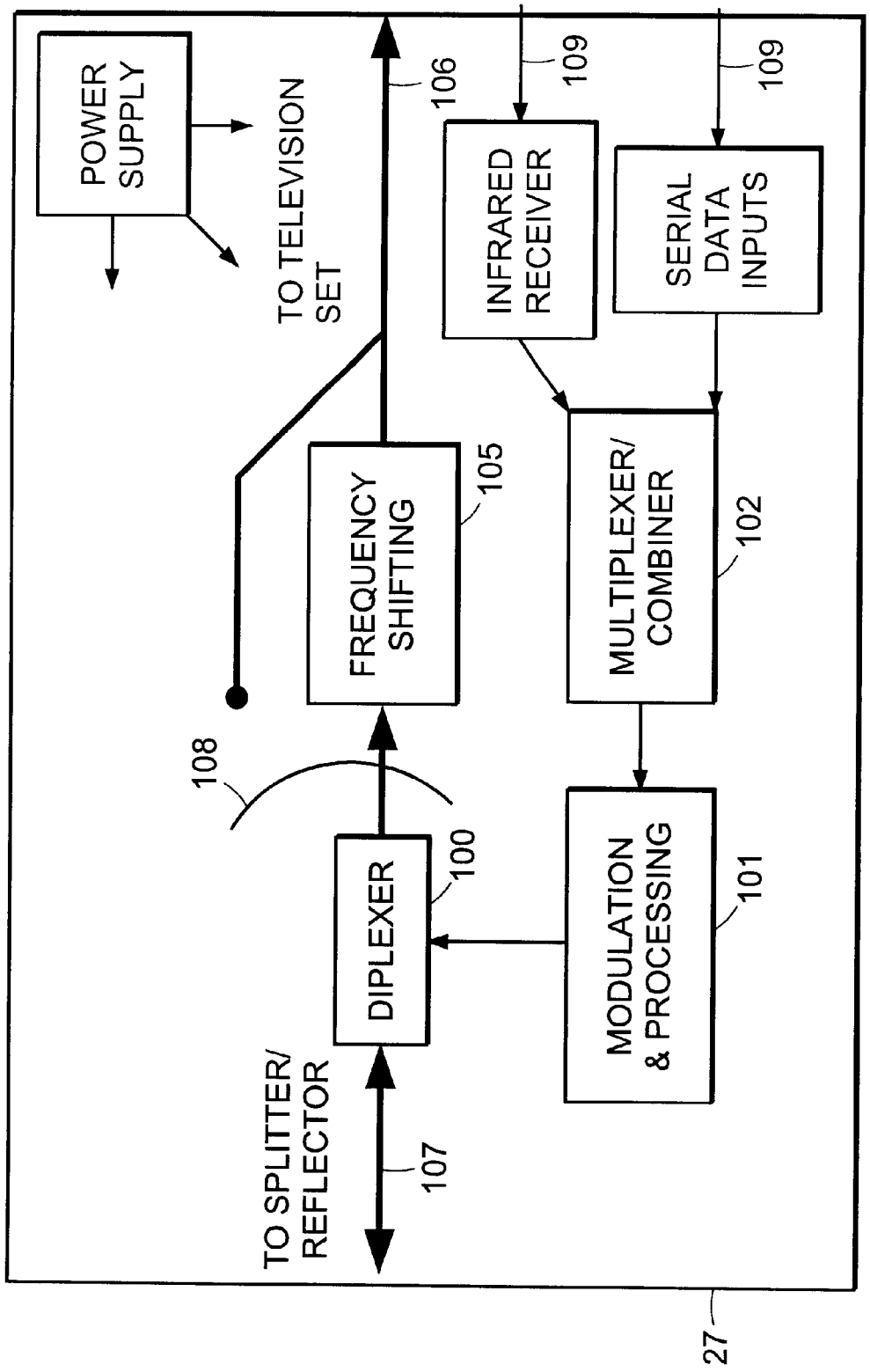
FIG. 10 shows a functional block diagram for a TV/monitor interface device employed in the system of FIG. 2.

FIG. 10 illustrates an embodiment of the interface device 27. The interface device 27, as indicated, may be connected to one or multiple input devices at port 109. Input signals from the communications station are multiplexed via a multiplexer/combiner 102 and modulated by a modulator 101 to a high frequency band $f_3$ which, preferably does not interfere with CATV services. In a preferred embodiment, frequency band $f_3$, selected for user input, is different than frequency band $f_2$, selected for video display output from the computing apparatus. Precompensation of the input signals from the communications station may be performed in networks with an uneven passband over the coaxial cable wiring scheme as described above. The input signal is then passed through a diplexer 100 or splitter and passed out of port 107 onto the in-home coaxial cable. It should be appreciated that the process described corresponds to the functions performed by the first component 54 of the interface device 27.

The video display signal from the computing apparatus 21, on the other hand, is received by the interface device 27 at port 107 and forwarded through a switch 108 to a frequency shifting or demodulating component 105 before passing out of port 106. In a preferred embodiment, port 106 is a dedicated connection to the remote display device, such as a television or computer monitor. Switch 108, meanwhile, allows user selectable viewing of either the broadband cable services or remote reception of the computing apparatus display output. The switch 108, in one embodiment, may be automatically or manually set. Additional video receiving devices, such as a settop or VCR appliances, may also be attached to port 106, for compatible operation with the interface device 27. This process, which formats the video signals for reception display on the communications station, corresponds to the functions performed by the second component 56 of the interface device 27.

In short, when employing the interface system 20 of the present invention to remotely access and fully utilize the processing capability of the central computing apparatus 21, input signals from a remote keyboard, a mouse, a video camera, or other input devices 22, as illustrated in FIG. 5, are first sent to the communications station interface device 27. The input signals are then modulated by component 54 to a frequency band $f_3$ that is different than the frequency band $f_1$ of the signals from the coaxial cable drop 24. In one embodiment of the invention, the input signals are modulated to a frequency band $f_3$ higher than about 860 MHz. In this manner, when the input signals are transmitted along the signal path 23 toward the splitter/reflector 25, the input signals, with a higher frequency $f_3$ than that provided for the signals from the coaxial cable drop 24 (i.e., frequency $f_1$), may be reflected by the splitter/reflector 25 toward the central computing apparatus 21 and prevented from being transmitted onto the coaxial cable drop 24. In the present invention, the splitter/reflector 25 is designed to reflect any signals higher than about 860 MHz along the signal path 23, while allowing signals lower than about 860 MHz to be transmitted across the splitter/reflector onto, for instance the coaxial cable drop 24. However, should reflection of signals having a different frequency range is required, the splitter/reflector 25 can be designed accordingly. The input signals are next sent to the computing apparatus interface device 26 wherein the input signals are demodulated by component 52 to a frequency capable of being recognized by the central computing apparatus 21. The demodulated input signal are also converted to a format compatible for processing by the central computing apparatus 21.

Once the input signals from the communications station 22 have been processed by the computing apparatus 21, the computing apparatus output signals which are to be transmitted along the signal path 23 back to the communications station 22. Prior to being transmitted to the communications station 22, the output signals from the computing apparatus 21 are transmitted to the computing apparatus interface device 26 wherein the output signals are modulated by component 50 to a frequency band $f_2$ that is different from the frequency band $f_1$ of the signals from the coaxial cable drop 24. In a preferred embodiment, the output signals are modulated to a frequency of higher than about 860 MHz, and may be in the same frequency range as that provided for the modulated input signals. The output signals are also preferably converted to a format compatible for detection by the communications station. If the communications station 22 includes a television monitor, the output signals may be converted to NTSC format. On the other hand, if the communications station 22 includes a computer monitor, the output signals may be converted to VGA, EGA, SVGA, or other analog or digital video format. The modulated and converted output signals from the computing apparatus 21 are next reflected by the splitter/reflector 25 toward the communications station interface device 27, where the output signals are demodulated by component 56 to a frequency detectable by the communications station 22. The output signals is further formatted for display on the appropriate communications station.

Reception of the computing apparatus video signal at the remote communications station is activated by a viewer at the remote location. If the computing apparatus is already in use by a local user, the local use and control of the computing apparatus takes precedence over the remote control of this system.

Figure 11:
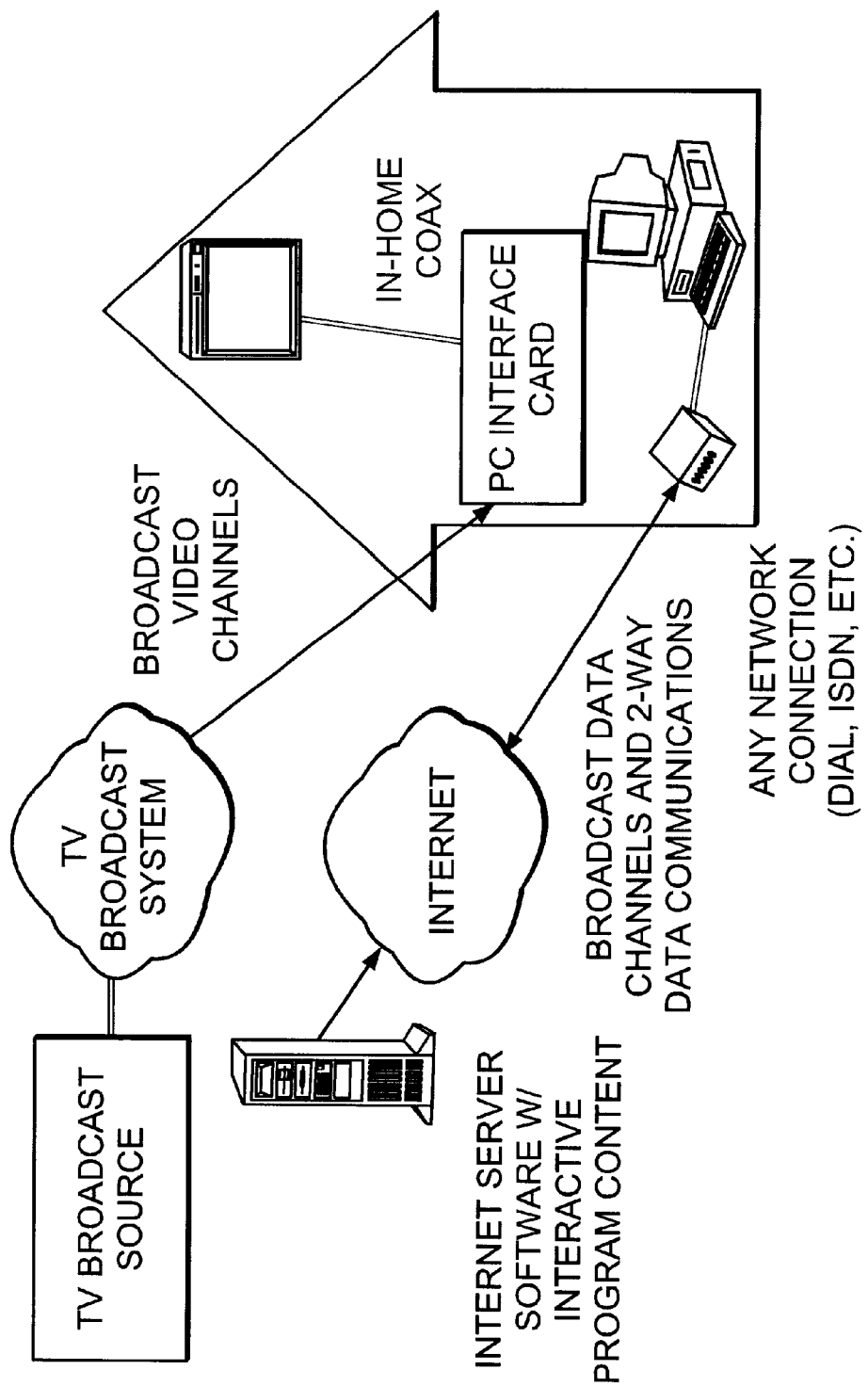
FIG. 11 illustrates application of the present invention with existing and emerging data communication networks.
Figure 12A:
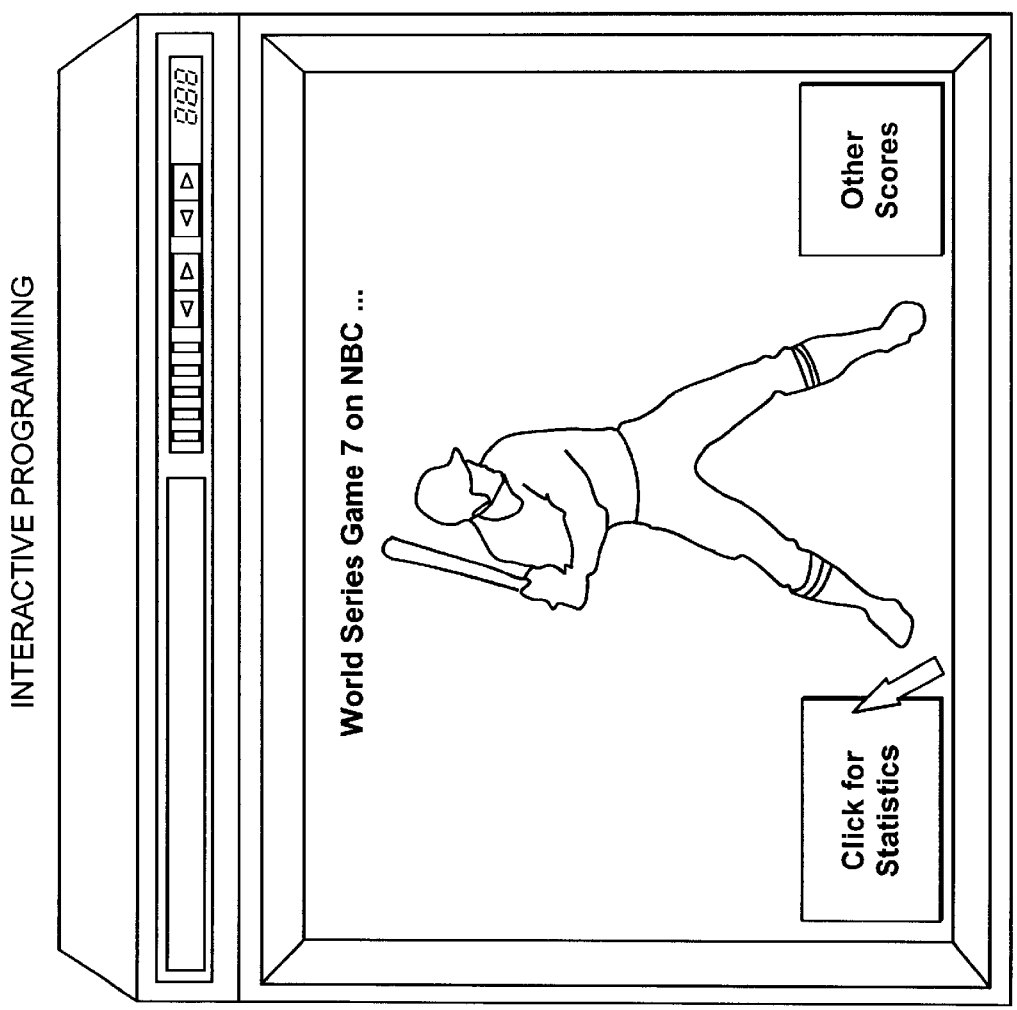
FIGS. 12A–12F illustrate potential user displays that are enabled by this invention.
Figure 12B:
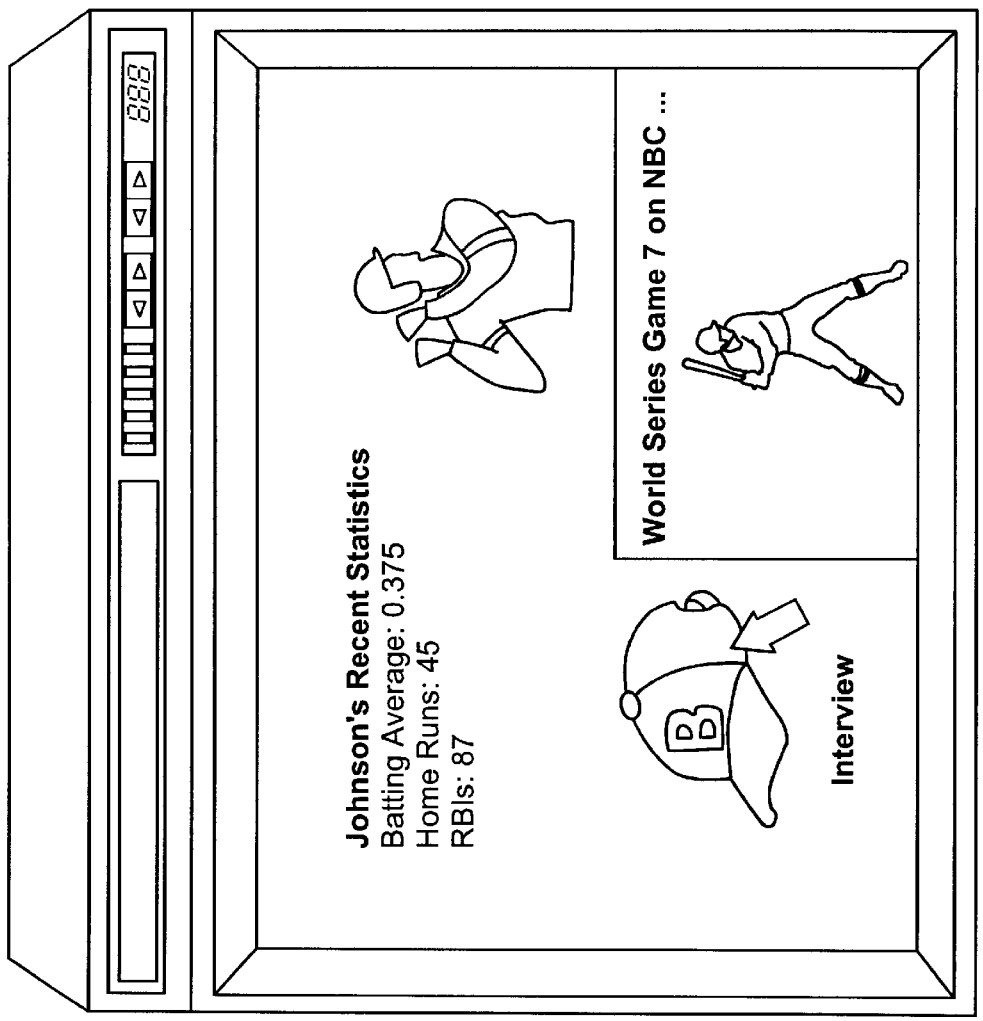
Figure 12C:
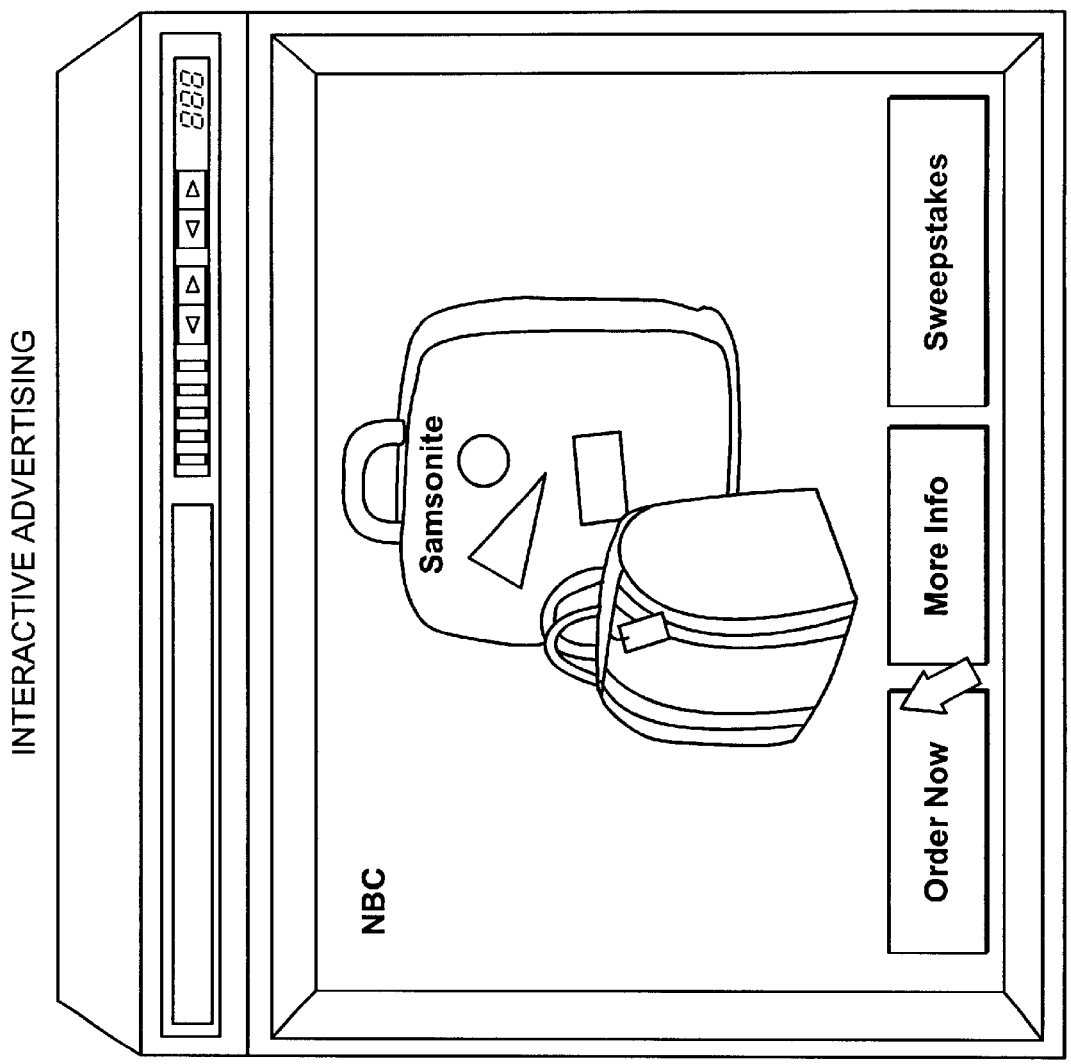
Figure 12D:
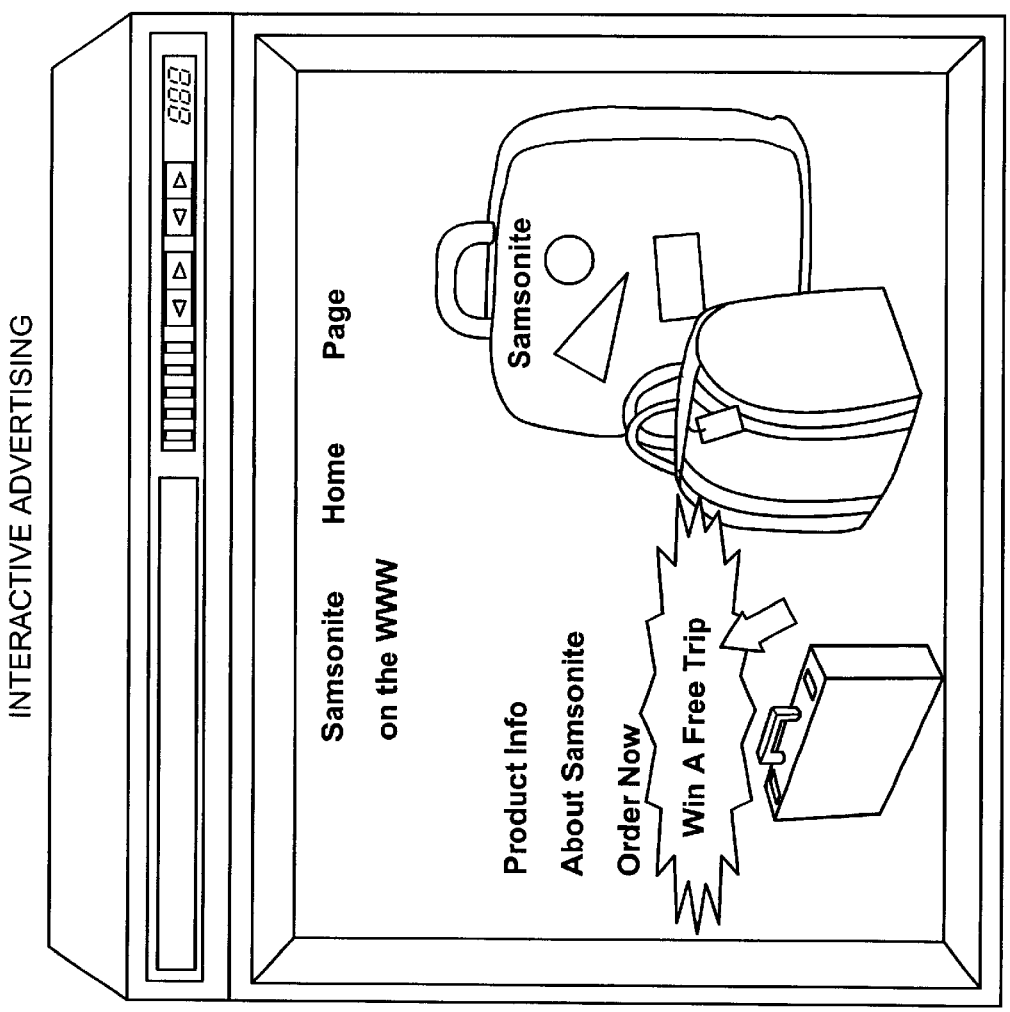
Figure 12E:
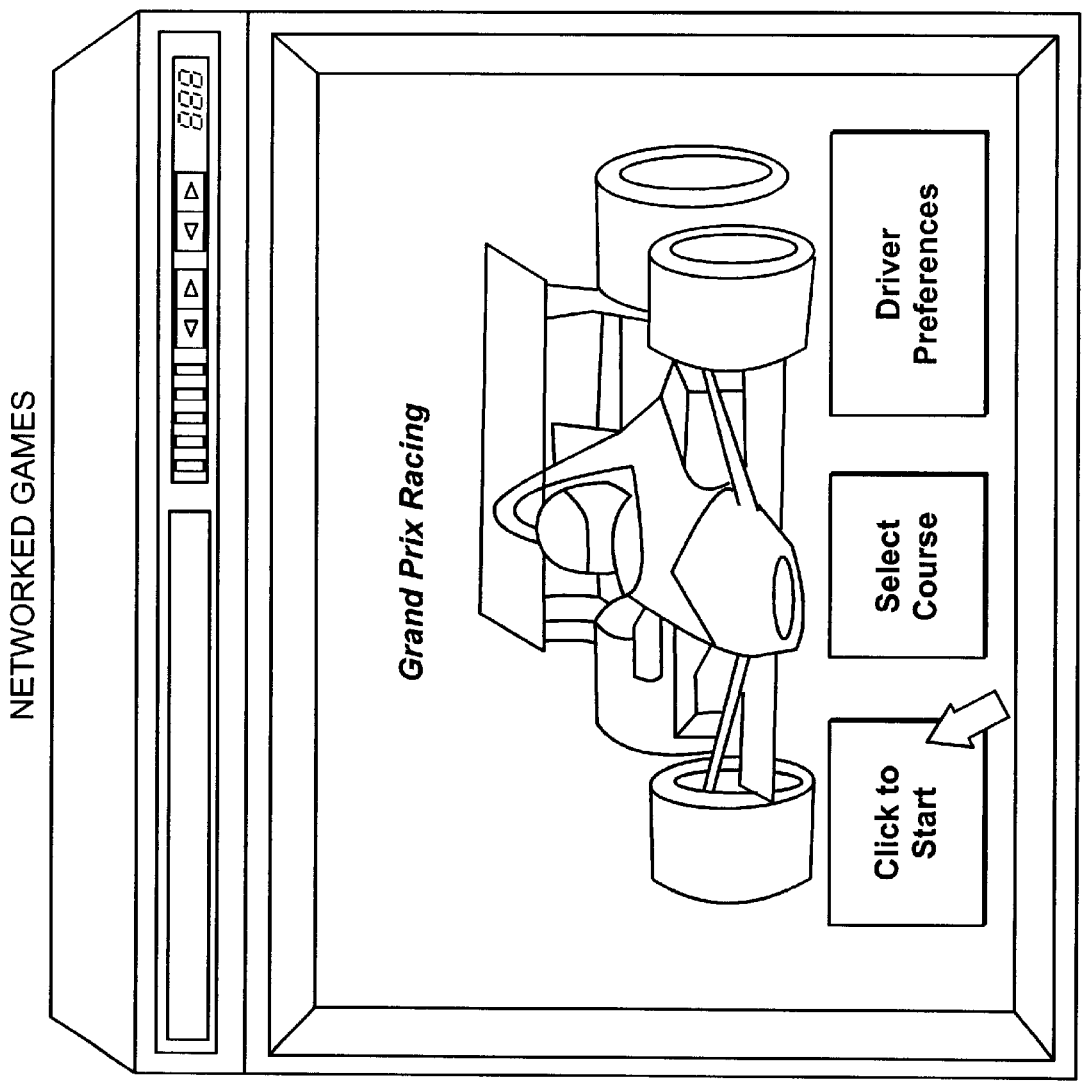
Figure 12F:
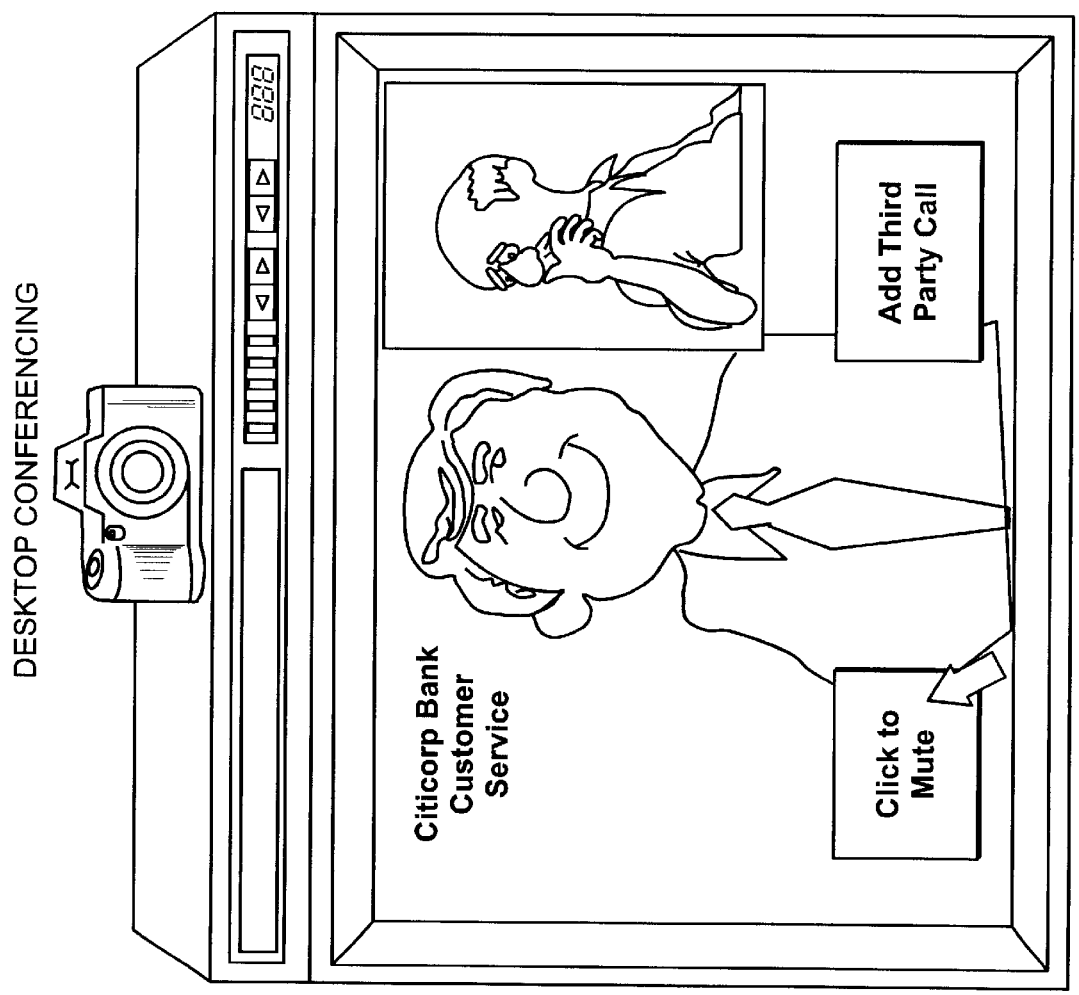

If the central computing apparatus 21 is networked (i.e., provided with access to the WWW on the Internet), each of the remotely situated communications stations 22 may similarly have the capability to access the Internet. Access to the Internet can be accomplished by the use of external network connection devices, such as a cable modem, a modem, an ISDN terminal adaptor, a router, a switch, a mux, or other existing and emerging data communications network connection devices. The input commands from the remote communications station 22 can be processed by the computing apparatus 21, as described above, and sent onto the Internet via the external network connection device. In turn, the signals received from the Internet by the computing apparatus 21 can be formatted and transmitted along the signal path 23 to a remote communications station 22 for display. In this manner, end user applications may use a composite of multiple simultaneous data network connection (e.g., over a phone line) and broadband network connection (e.g., over a CATV cable) to allow interactive computing and entertainment programming. End user applications may, in addition, use a composite of broadcast video services (e.g., CATV channels) and interactive data services to allow interactive computing and entertainment programming. As shown in FIG. 11, programming which employs simultaneous connection to and use of broadband and data network connections may be developed over the Internet for interactive two-way data transfers which corresponds to simultaneous broadcast CATV reception. This creates a single user viewing experience even though multiple underlying network connections are used to deliver and create the viewing experience. Examples of some of the services which may be made available through this simultaneous connection are illustrated in FIGS. 12A–12F. The services may include, but are not limited to, interactive programming (FIG. 12A), Internet applications (FIG. 12B), interactive advertising (FIGS. 12C and 12D), networked games (FIG. 12E), and desktop conferencing (FIG. 12F).

The interface system of the present invention is designed to support one or multiple user sessions on a single computing apparatus. In particular, by employing multiple computing apparatus interface devices that are strategically located within the system, one central computing apparatus may be accessed remotely by one or more communications stations at a time. In addition, any applications made available to the computing apparatus, whether locally or through the Internet, will be accessible by each of the remote communications station. The remotely situated communications stations are non-processing extensions of the central computing apparatus, and, to a certain extent, permit an increase in the number of sites where the user may access the processing capability of the computer without having to provide a computing apparatus at each of the sites. To this end, the user may avoid incurring outrageous expenses associated with the buying of additional computing apparatus.

What is claimed is:

1. A system for providing an interface between a central computing apparatus providing output signals and at least one communications station providing input signals on a two-way signal path, the system comprising:

a splitter-reflector preventing the output signals from the computing apparatus and the input signals from the communications station from passing to a signal distribution system and for coupling signals having a third frequency band from the signal distribution system onto the signal path;

a first component positioned in the signal path adjacent the central computing apparatus for converting output signals from the central computing apparatus to signals having a first frequency band;

a second component positioned in the signal path adjacent the communications station for modifying the converted output signals from the central computing apparatus to a frequency detectable by the communications station;

a third component positioned in the signal path adjacent the communications station for converting the input signals from the communications station to signals having a second frequency band; and a fourth component positioned in the signal path adjacent the central computing apparatus for modifying the converted input signals from the communications station to a frequency recognizable by the central computing apparatus.

2. A system as set forth in claim 1 wherein the signals having a third frequency band does not interfere with the first frequency band of the output signals and the second frequency of the input signals.

3. A system as set forth in claim 1 wherein the frequency bands of the output and input signals are greater than about 750 MHz, and the frequency band of the signals from the signal distribution system is less than about 750 MHz.

4. A system as set forth in claim 1 wherein the reflector-splitter maintains signals having a frequency band that is greater than about 750 MHz within the signal path.

5. A system as set forth in claim 4 wherein the reflector is designed to allow signals having a frequency band of less than about 750 MHz to be transmitted across the reflector.

6. A system as set forth in claim 4 wherein the reflector-splitter is frequency sensitive and is capable of splitting signals of a selected frequency along the signal a path.

7. A system as set forth in claim 1 wherein the means coupled to the signal path includes a coaxial drop cable.

8. A system as set forth in claim 1 wherein the means coupled to the signal path includes a satellite signal receiver.

9. A system as set forth in claim 1 further including means for communication between the computing apparatus and a data network.

10. A system as set forth in claim 9 wherein the first component is designed to further convert signals from the data network to output signals having a first frequency band.

11. A system as set forth in claim 1 wherein the two-way signal path includes a coaxial cable connecting the communications station and the central computing apparatus.

12. A system as set forth in claim 1 wherein the two-way signal path is designed to support frequency division multiplexing.

13. A system as set forth in claim 1 wherein the first component is further capable of converting the output signals from the central computing apparatus into a format compatible for detection by the communications station.

14. A system as set forth in claim 13 wherein the fourth component is further capable of modifying the converted input signals from the communications station into a format suitable for processing by the central computing apparatus.

15. A system as set forth in claim 1 wherein the second component is further capable of formatting the converted output signals from the central computing apparatus for detection by the communications station.

16. A system as set forth in claim 1 wherein the communications station includes a video display device and a signal input device.

17. A system as set forth in claim 16 wherein the converted output signals is in a format compatible for displaying on the video display device.

18. A system for providing multimedia computing and entertainment between a central computing apparatus providing output signals and at least one communications station providing input signals, the system comprising:
   a two-way signal path for facilitating communication between the communications station and the central computing apparatus;
   a splitter-reflector;
   a first component positioned in the signal path adjacent the central computing apparatus for converting output signals from the central computing apparatus to signals having a frequency band $f_2$;
   a second component positioned in the signal path adjacent the communications station for modifying the converted output signals from the central computing apparatus to a frequency detectable by the communications station;
   a third component positioned in the signal path adjacent the communications station for converting the input signals from the communications station to signals having a frequency band $f_3$;
   a fourth component positioned in the signal path adjacent the central computing apparatus for modifying the converted input signals from the communications station to a frequency recognizable by the central computing apparatus; and
   wherein the splitter-reflector prevents signals from frequency bands $f_2$ and $f_3$ from being passed off of the two-way signal path while allowing signals having frequency band $f_1$ to be transmitted onto and off of the two-way signal path;
   wherein $f_2 \neq f_1$, and $f_3 \neq f_1$.

19. A system as set forth in claim 18 wherein the two-way signal path includes a coaxial cable connecting the communications station and the central computing apparatus.

20. A system as set forth in claim 18 wherein the two-way signal path is designed to support frequency division multiplexing.

21. A system as set forth in claim 18 the reflector-splitter includes a coaxial drop cable.

22. A system as set forth in claim 21 wherein the reflector-splitter is frequency sensitive and is capable of splitting signals of a selected frequency along the signal path.

23. A system as set forth in claim 18 wherein the reflector-splitter includes a satellite signal receiver.

24. A system as set forth in claim 18 wherein the communications station includes a video display device and a signal input device.

25. A system as set forth in claim 18 wherein the output signal frequency $f_2$ and input signal frequency $f_3$ do not interfere with signal frequency $f_1$ from the television distribution system.

26. A system as set forth in claim 18 further including means for communication between the computing apparatus and a data network.

27. A system as set forth in claim 26 wherein the first component is designed to further convert signals from the data network to output signals having a frequency $f_2$.

28. A method for providing an interface between a central computing apparatus and at least one communications station, the system comprising the steps of:
   providing a two-way signal path between the central computing apparatus and the communications station;
   reflecting the input signals from the communications station along the signal path so as to direct the input signals to the central computing apparatus;
   directing signals from a signal distribution service onto the two-way signal path; and
   converting the input signals from the communications station into a format compatible with the central computing apparatus for processing
   wherein the input signals are prevented from being transferred off of the two-way signal path to the signal distribution service.

29. A method as set forth in claim 28 further comprising the steps of:
   converting output signals from the central computing apparatus into a format compatible for detection by the communications station;

reflecting the output signals along the signal path so as to direct the output signals to the communications station;

modifying the output signals to a format compatible with the communications station for display.

30. A method as set forth in claim 29 further comprising the steps of:

modulating input signals from the communications station to a first frequency band prior to the step of reflecting the input signals;

demodulating the input signals from the communications station, after the step of reflecting the input signals, to a frequency band compatible for processing by the central computing apparatus;

modulating the output signals from the central computing apparatus to a second frequency band prior to the step of reflecting the output signals; and demodulating the output signals from the central computing apparatus, after the step of reflecting the output signals, to a frequency detectable by the communications station.

31. A method as set forth in claim 28 further comprising the steps of:

providing means for communication between the computing apparatus and a data network;

converting the signals from the data network into output signals with a format compatible for detection by the communication station;

mixing the signals from the data network with information generated from the computing apparatus into the output signals;

reflecting the output signals along the signal path so as to direct the output signals to the communications station; and modify the output signals to a format compatible with the communications station for display.

32. A method as set forth in claim 31 further comprising the steps of:

modulating input signals from the communications station to a first frequency band prior to the step of reflecting the input signals;

demodulating the input signals from the communications station, after the step of reflecting the input signals, to a frequency band compatible for processing by the central computing apparatus;

modulating the output signals from the central computing apparatus to a second frequency band prior to the step of reflecting the output signals; and demodulating the output signals from the central computing apparatus, after the step of reflecting the output signals, to a frequency detectable by the communications station.

33. A system for providing an interface between a central computing apparatus providing output signals and at least one communications station providing input signals, the system comprising:

a two-way signal path for facilitating communication between the communications station and the central computing apparatus;

a splitter-reflector preventing the output signals from the computing apparatus and the input signals from communications station from passing off of the two-way signal path to a signal distribution system and for coupling signals having a frequency band $f_1$ from the signal distribution system onto the signal path;

a first component positioned in the signal path adjacent the central computing apparatus for converting output signals from the central computing apparatus to signals having a frequency band $f_2$;

a second component positioned in the signal path adjacent the communications station for modifying the converted output signals from the central computing apparatus to a frequency detectable by the communications station;

a third component positioned in the signal path adjacent the communications station for converting the input signals from the communications station to signals having a frequency band $f_3$; and a fourth component positioned in the signal path adjacent the central computing apparatus for modifying the converted input signals from the communications station to a frequency recognizable by the central computing apparatus.

34. A system as set forth in claim 33 wherein $f_2 \neq f_1$, and $f_3 \neq f_1$.

35. A system as set forth in claim 34 wherein the output signal frequency $f_2$ and input signal frequency $f_3$ do not interfere with the signal frequency $f_1$ from the signal distribution system.

36. A system as set forth in claim 33 further comprising means for transmitting broadband signals to the computing apparatus and the communications station.

37. A system as set forth in claim 36 further comprising means for communication between the computing apparatus and a data network.

38. A system as set forth in claim 37 wherein the first component is designed to further convert signals from the data network to output signals having a frequency $f_2$.

39. A frequency selective device for use with a centralized computing system having a central computing apparatus and at least one communications station, the device comprising:

an input port connected to a cable from a cable television distribution system;

a plurality of output ports connected to a signal pathway between the computing apparatus and the communications station;

a first filter situated between the input and output ports (i) to allow a signal below a certain frequency band to pass between the ports through the first filter, and (ii) to prevent a signal above said certain frequency band from passing through the first filter:

a second filter disposed between the first filter and the output port to prevent transmission of a signal below said certain frequency band along the signal pathway between the computing apparatus and the communications station;

a signal splitter for dividing signal from the first filter into a plurality of signals; and means for partitioning the plurality of signals toward the output ports and toward the second filter.

40. A device as set forth in claim 39 wherein the second filter permits a signal above said certain frequency band to pass therethrough so as to allow the signal to move along the signal path between the computing apparatus and the communications station.

41. A device as set forth in claim 40 wherein said certain frequency band is approximately 750 MHz.

42. A device as set forth in claim 39 wherein partitioning means comprises a splitter for each of the signals divided by the signal splitter.

43. A device as set forth in claim 39 wherein partitioning means comprises a tap for each of the signals divided by the signal splitter.

* * * * *